United States Patent [19]

Broc et al.

[11] 4,271,506
[45] Jun. 2, 1981

[54] HIGH SPEED DATA SWITCHING NODE

[75] Inventors: Guillaume Broc, Paris; Edouard Asseo, Sainte Genevieve des Bois, both of France

[73] Assignee: U.S. Philips Corporation, New York, N.Y.

[21] Appl. No.: 62,194

[22] Filed: Jul. 30, 1979

[30] Foreign Application Priority Data

Aug. 3, 1978 [FR] France .............................. 78 22966

[51] Int. Cl.³ .............................................. H04J 3/02
[52] U.S. Cl. ...................................... 370/89; 370/13; 370/60
[58] Field of Search ...................... 370/89, 86, 85, 92, 370/13, 60

[56] References Cited

U.S. PATENT DOCUMENTS

| | | | |
|---|---|---|---|
| 3,790,717 | 2/1974 | Abramson et al. | 370/89 |
| 4,019,176 | 4/1977 | Cour et al. | 370/89 |
| 4,071,706 | 1/1978 | Warren | 370/89 |

Primary Examiner—Douglas W. Olms
Attorney, Agent, or Firm—Thomas A. Briody; William J. Streeter; Edward W. Goodman

[57] ABSTRACT

A data switching node for the simultaneous high speed transmission of data originating from a plurality of source data switching units to a plurality of destination data switching units connected via time bus interface on a looped unidirectional time bus wherein the total information carrying capacity of the node is time multiplexed into separate data channels. Further the time bus interfaces comprise means to vary the number of data channels and their frequency of repetition, to share common channels, to detect between successful and unsuccessful transmissions, to store unsuccessful transmissions for retransmission, to transmit to several destinations at the same time, to monitor load conditions, to detect transmission and other errors on the node and to inform the node controller accordingly.

11 Claims, 22 Drawing Figures

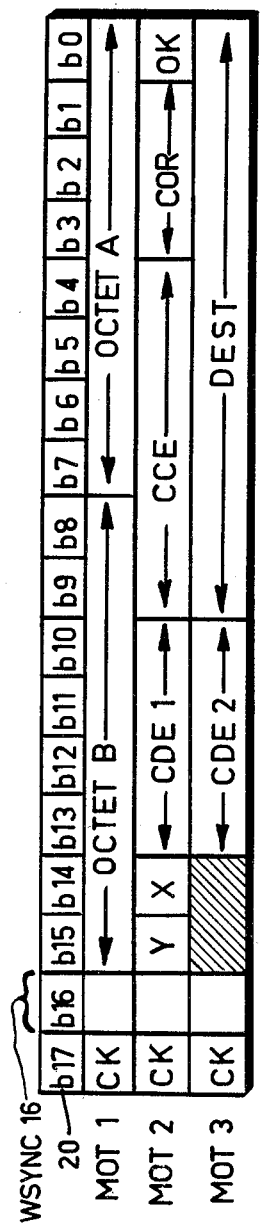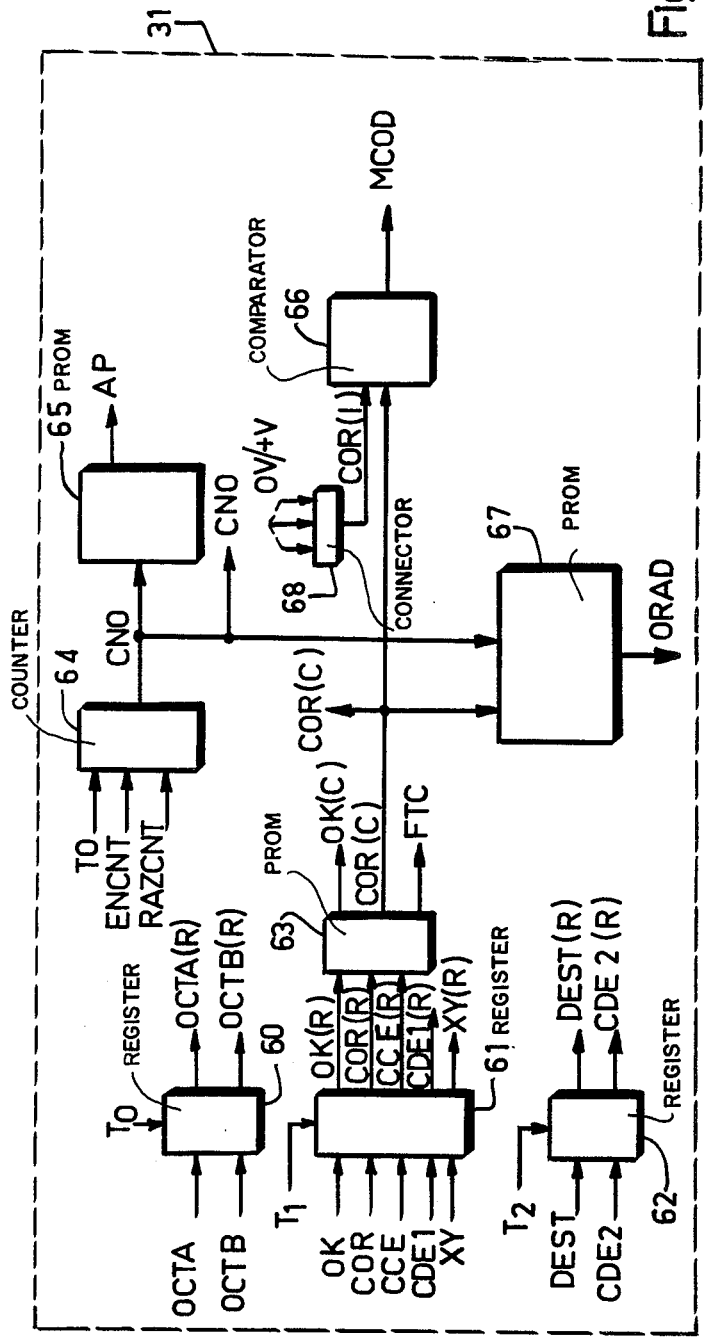

HIGH SPEED DATA SWITCHING NODE

BACKGROUND OF THE INVENTION

The present invention is intended to be used in a data switching node for switching data from a plurality of source data switching units to a plurality of destination data switching units connected by means of time bus connectors to a looped unidirectional time bus wherein the total information carrying capacity of said time bus is time division multiplexed into a plurality of separate data channels comprising data switching control unit means for the connection of said source and destination data switching units.

Thus, the present invention relates to loop type communication systems in general and to local data switching nodes in message and packet switching networks in particular.

In the prior art, loop type communication systems have employed several time division multiplexing techniques. One such technique permanently assigns separate data slots or channels to each device connected on the looped bus, so that each device is only able to transmit in its assigned data channel. This is inefficient as a large part of the communication bandwidth is wasted if only a few of the total number of connected devices are communicating at a given moment.

Another technique uses addressed messages, thus allowing devices to utilise any data channel, but additional communication space is required for the addresses, while the problem of devices attempting to communicate at the same time has to be resolved by polling techniques.

Still another technique uses a combination of permanently assigned data channels for each device together with dynamically assigned data channels, where a master controller assigns additional data channels to specific devices when required. This adds flexibility but the terminal must be commanded, that is, a master controller is required to control the whole communication loop.

In the context of message switching systems the high speed transmission of data on the local loop or node is not the only consideration. The desirable characteristics of a message or packet switching system necessitate that a local node must not only be able to switch messages originating from devices connected to the local node to other destination devices connected to the same node, but must also be able to accept and switch incoming messages originating on remote nodes or devices to destination devices on the local node or remote nodes. Thus, a data switching node, in addition to a high data transmission rate, also requires the following specific characteristics.

1. High reliability to ensure that data is not lost.
2. Flexibility to handle different ranges of data volume without causing congestion on the node.
3. Flexibility to expand the capacity of the node to accomodate larger message switching system traffic.
4. Interface standardisation allowing easy connection between different and often incompatible data handling equipment and terminals.

The time division multiplexing techniques mentioned have also been used for message switching systems.

SUMMARY OF THE INVENTION

It is an object of this invention to provide a switching node using a high speed looped bus employing time division multiplexing to fulfill the criteria mentioned in the section before.

Thus, the invention is characterized in that the system further comprises means to simultaneously switch data on said time bus between a plurality of said sources and destinations, said switching means being incorporated in said time bus connectors, each of which comprises:

a. source data storage means for data received directly from source data switching units.

b. destination address storage means for destination addresses corresponding to said stored source data, said destination address storage being organised in a specified manner corresponding to the sequence in which said source data is to be transmitted on said time bus.

c. channel storage means wherein the channel numbers and destination addresses corresponding to data channels currently transmitting said source data are recorded.

d. destination data storage means whereby data received from said time bus data channels is buffered, before transmission to the specified destination data switching unit.

All time bus connectors are identical, presenting the same interface to data switching units and to the looped time bus, thus helping to fulfill the interface standardisation requirements already mentioned, as well as facilitating the addition of extra equipment for expanding the capacity of the node. Buffering of input/output by means of storage helps to smooth out irregularities in the volume of data being switched, for example sudden peaks, thus avoiding congestion, while the flexibility of data channel usage increases efficiency.

Another objective of the invention is to achieve autonomous functioning of each time bus connector in order to minimise control by data switching units and central controllers of the node. This is achieved by each time bus interface being able to recognise when common data channels are being used by other time bus interfaces and to recognise whether the destination is busy or otherwise and to proceed accordingly.

Another objective of the invention is to increase efficiency by automatic retransmission of data without the intervention of the source switching unit when data transmission has been unsuccessful either due to the destination being busy or because data has been changed (corrupted).

Thus, the source data switching unit can occupy itself with switching data to other destinations without being put into a wait state until successful retransmission has been accomplished by the time bus connector. After that the data switching unit can resume transmission of data for the destination in question.

A still further objective of the invention is to establish a criterion for the number of unsuccessful transmissions existing for a time bus interface at a given moment. This indicates the load conditions on the time bus and at the destinations.

Another objective of the invention is to initiate system action when the established overload criterion has been reached for a time bus connector. Thus the system is continuously able to monitor traffic conditions on the node, and to take the appropriate action when necessary.

Another objective of the invention is to vary the criteria for overload, thus adding flexibility to the control of a node under different data switching conditions.

Another objective of the invention is to give each time bus connector the capability to detect and correct certain errors for all data circulating on the time bus and to inform the system when errors are uncorrectable. This insures reliable data transmission.

DESCRIPTION OF THE DRAWING

These and other objectives will become clear in a specific embodiment of the invention to be described in detail with reference to the accompanying figures.

FIG. 2 illustrates the data channel specification.

FIG. 6 is a logic block diagram of the input interface of a time bus connector with the time bus.

The Annex I contains a list of all control signals and data paths, together with their definition, used to describe the present invention.

DESCRIPTION OF THE PREFERRED EMBODIMENT

Figure 1:
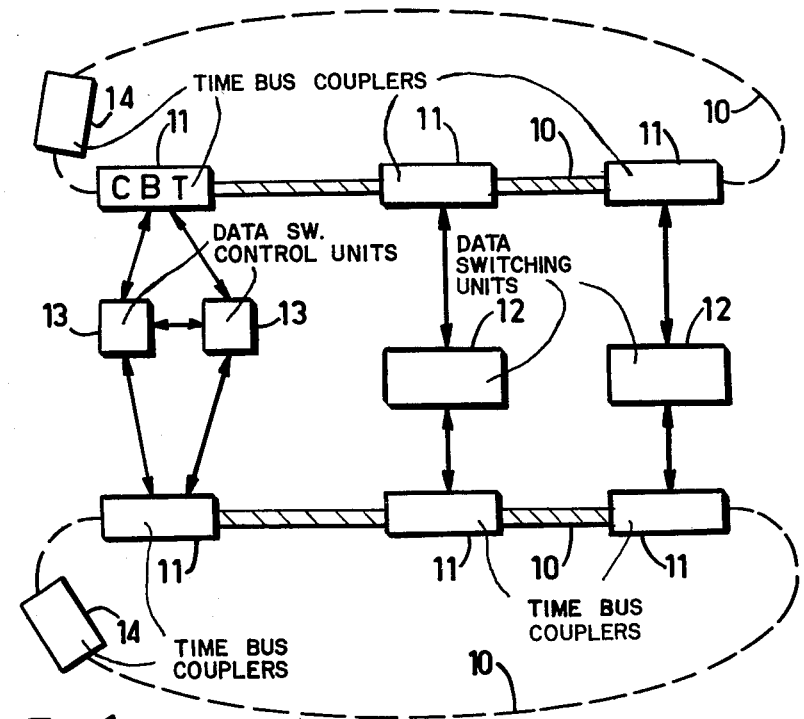
FIG. 1 illustrates a block diagram arrangement of a typical data switching node incorporating the present invention in a message switching application.

FIG. 1 is a block diagram of a data switching node used in message switching applications pertaining to the present invention. The looped unidirectional time bus, henceforth referred to as the BT, is represented by 10. Part of the BT 10 is shown in broken lines to indicate that the loop is continuous and that a number of time bus couplers, represented as 11 and henceforth referred to as CBT, may be connected. The BT 10 consists of 18 individual lines, each a twisted pair, to minimize noise problems inherent in high speed transmission, and is thus capable of transmitting an 18 bit word in parallel. Data channels transmitted on BT 10, are generated by a pilot CBT 14. Each CBT slave 11 is connected to BT 10 and either to a data switching unit, 12, henceforth referred to as DSU, or to a data switching control unit, 13, henceforth referred to as a DSCU.

From the viewpoint of management of the frame of channels, the CBT pilot 14 has the same switching functions with reference to a DSU 12, or a DSCU 13 to which it is connected.

Each DSU 12, may be connected in both input and output modes to a number of data terminals by means of synchronous and asynchronous lines. These terminals may be locally connected, or they may be remotely connected via modem interfaces, that is, they may be located on some other physically distant node. The source DSU 12 receives information bits from the line units, analyses and assembles them into characters; the characters in turn are stored as messages or data packets of a given format and then switched via the source CBT 11, and the BT 10, to the destination CBT 11, which in turn transmits the message or packet to the destination DSU 12. The destination DSU 12 treats the string of characters to form bits for transmission either to a terminal, locally connected on the node, or to a remote node or terminal via a high speed modem interface.

A DSCU 13 supervises the interconnection of sources and destinations and performs other supervisory functions on the node, such as regulating the flow of traffic on the node, monitoring errors etc. The number of DSCU, 13, each comprising an appropriately programmed minicomputer, storage and peripherals, and DSU 12, each comprising a microcomputer storage and appropriate input/output interfaces, and CBT 11, that may be connected on a node, are dependent on the number of communication lines and terminals required, and can be varied up to a maximum permissable limit. Usually several DSU 12 are controlled by a single DSCU 13. The main function of the BT 10 and the CBT 11 is to transport in a transparent manner data provided by DSU 12 as per the connection commands of a DSCU 13. It should be understood that DSCU, DSU and their associated communication lines and interfaces are not the subject of the present invention, but have been briefly described to provide a better understanding of the communication environment in which the high speed time division bus system functions.

As illustrated in FIG. 1, each node comprises two identical BT 10, at any given instant one being on line and the other on standby, with DSU and DSCU being connected to CBT on both BT. In the event of a failure of the online BT, the standby BT is activated and all subsequent communication is transmitted on it, while the faulty BT is repaired. For reliability reasons all DSCU and DSU (not shown as such in FIG. 1) are also duplicated. As a CBT communicates principally with a DSU, and because the CBT/DSU interface is nearly identical to a CBT/DSCU interface, the invention will be described with reference to communication with a DSU, any specific procedures with reference to a DSCU being explicity described.

FIG. 2 specifies the structure of a data channel. Each data channel is composed of three 18 bit words represented by 20 in FIG. 2. A train of p consecutive channels transmitted sequentially constitutes a frame each channel being allocated a time slot and number according to its position in the frame. The pilot CBT 14 generates and synchronises the frame of channels for use by slaves CBT 11 and its own use. The information specified by a data channel is given below.

WORD 1

Bits 0–7 (8 bits): Data Octet A
Bits 8–15 (8 bits): Data Octet B

WORD 2

Bit 0 (1 bit): Occupation bit (OK). When set to 1 it specifies that a channel is occupied; when reset to 0, it specifies that a channel is free.

Bits 1–3 (3 bits): CBT Origin Code (COR). Defines address of the transmitting or source CBT.

Bits 4–9 (6 bits): Error Correction Code (CCE). Corrects double errors related to OK and COR.

Bits 10–13 (4 bits): Error Detection Code (CDE1). Detects single errors related to Octet A and bit X.

Bits 14–15 (2 bits): Code XY. Defines meaning of information being transmitted.

WORD 3

Bits 0–9 (10 bits): Destination address (DEST). Specifies address of destination CBT.

Bits 10–13 (4 bits): Error Detection Code (CDE2). Detects single errors related to Octet B and bit Y.

Bits 14–15 (2 bits): not used. Reserved for future usage.

Bits 16–17 (2 bits) for each word: Frame and channel synchronisation respectively.

An original code COR is assigned to each CBT; the same COR may be utilised by more than one CBT; whenever two CBT have the same origin code, they cannot be assigned a common channel.

Each CBT can be assigned a maximum of 8 different channels in a frame of 32 channels; when the number of channels in a frame exceeds 32, the CBT are assigned the same channel numbers modulo 32.

A common channel can be assigned to a maximum of 8 CBT.

The XY code specifies the significance of the information being transmitted on BT, for example, if the A and B octets are data or fault information, the start of the end of message.

The CBT and the BT are both transparent to the XY code, which is coded and decoded by the source and destination DSU respectively; thus it is not pertinent to the present invention.

Figure 3:
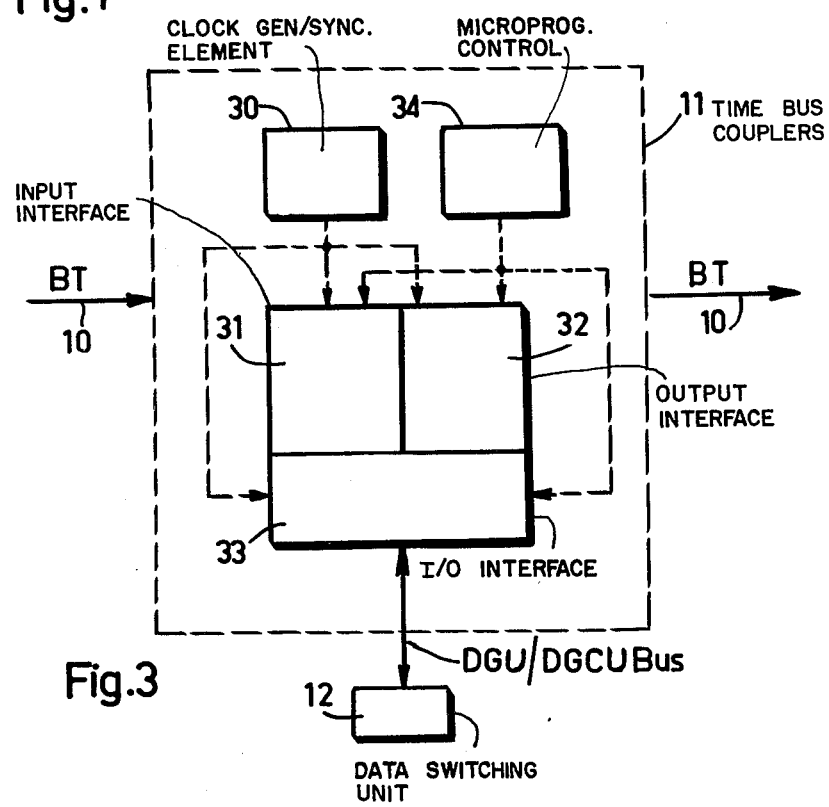
FIG. 3 illustrates a time bus connector in block diagram form.

FIG. 3 illustrates the major elements of a CBT 11 in block diagram form. The pulses are generated by clock generation and synchronisation element 30; the input interface with the BT 10 is 31; the output interface with BT 10 is 32; the input/output interface with a DSU 12 is 33; and CBT control is provided by microprogrammed control section 34.

Figure 4:
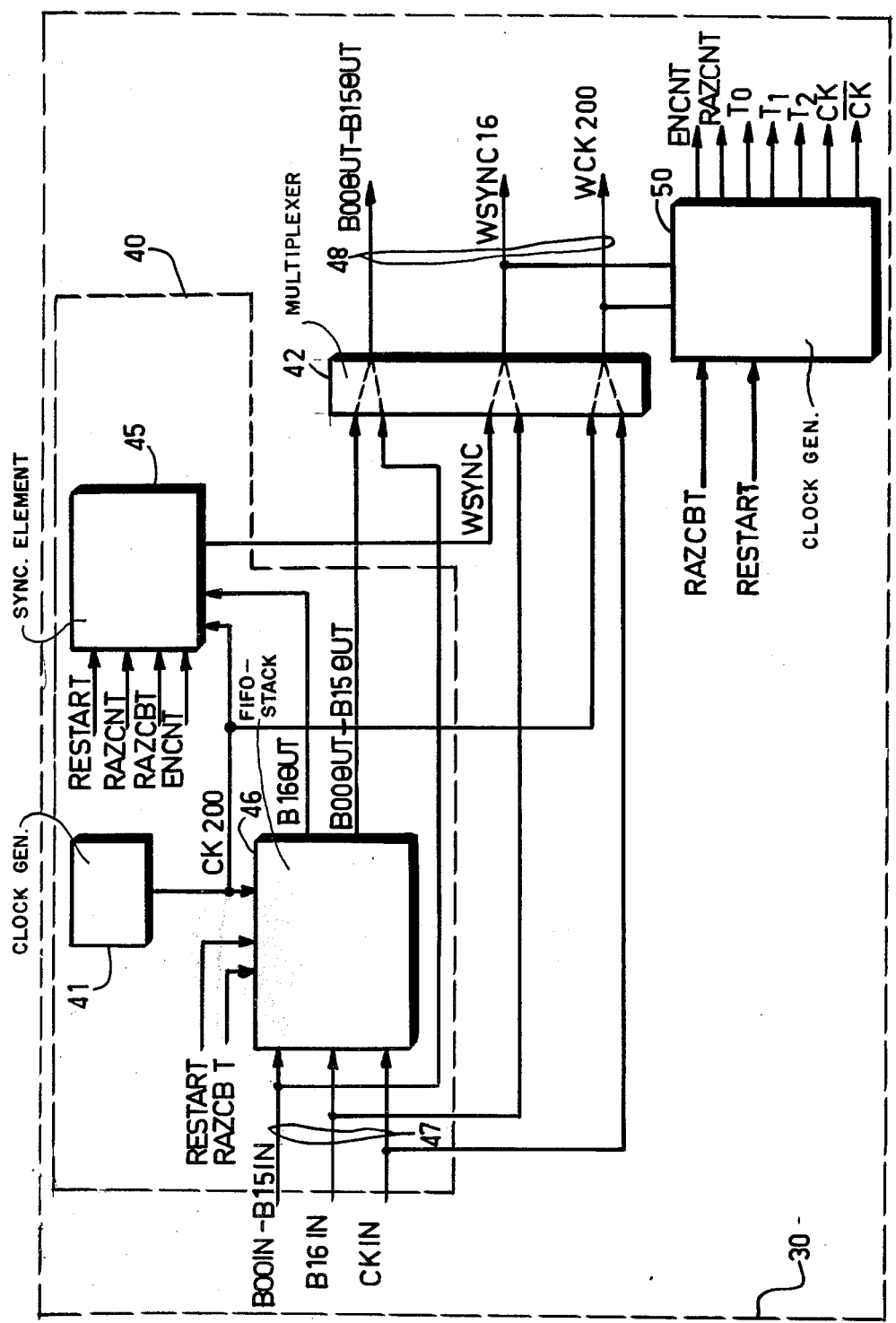
FIG. 4 is a logic block diagram of the major components of the synchronisation and clock generation system of a time bus connector.

FIG. 4 is a logic block diagram of the clock generation and synchronisation element 30. In a pilot CBT 14, the signals generated by element 40 are active, while they are inactive in a slave CBT 11. Thus, any CBT can be assigned either as a pilot or a slave. Element 40 provides the timing signals generated by a pilot CBT 14 which has the responsibility for generating the frame of channels and for maintaining their synchronisation.

In a pilot CBT 14, the channel words received from the BT are input to a First In First Out register (FIFO) 46, and then output by a clock signal CK 200 generated by clock generator 41.

In a pilot CBT 14, the multiplexer 42 is activated to output the clock signal CK 200, the synchronisation signal WSYNC generated by element 40 and the channel words output from FIFO 46.

In a slave CBT 11, the multiplexer 42 outputs the clock signal CKIN, the synchronisation signal B16IN and the channel words received from the BT 10.

The pilots CBT 14 and the slaves CBT 11 have identical clock pulse generation elements 50 which, depending on utilisation, receive either the clock signal CK 200 and synchronisation signal WSYNC from element 45 or signals from the input interface with the BT, that is, the signals CKIN and B16IN. These signals are output by multiplexer 42 as WCK 200 and WSYNC 16.

At initial switch on, or in the event of an error condition, a (reset to zero CBT) signal RAZ CBT is emitted by the DSCU 13, controlling the node, this signal being individually transmitted to all CBT connected and serving to re-initialize them by resetting the contents of elements 45, 46 and 50. The RAZ CBT signal is followed by a RESTART signal which puts the above mentioned elements 45, 46 and 50 of CBT into a ready state.

Thus, following a RAZ CBT and RESTART, the clock generator 41 generates the signal CK 200 while element 45 generates the synchronisation signals WSYNC for the first frame.

These signals, output via multiplexer 42, are utilised by the clock generation element 50 to reset to 0 the signal RESTART, to generate the internal timing signals $T_0$, $T_1$, $T_2$, ENCNT, CK and $\overline{CK}$, besides being transmitted on BT 10 to the following CBT connected.

The element 45 is also programmed with the number of channels assigned to the frame and has arithmetic capability to count the number of channels emitted and to compare this number with the number of channel assigned to the frame. The element 45 systematically generates WSYNC during the third word of the second last and last channels in the frame, that is, during the $(p-1)^{th}$ and $p^{th}$ channels. This allows a pilot CBT 14, via element 50, to detect the end of frame and to generate a pulse signal RAZ CNT in order to reset to 0 its channel counter. (The signal B16OUT generated by element 46 is also used by element 45 to control the frame.)

Normally, the number of data channels assigned to a frame is greater than the number of slave CBT 11 connected on a node. Each channel word emitted by a pilot CBT 14 is separated by 200 ns, that is, a channel is emitted every 600 ns. For correct synchronisation, all channel words received on the input lines shown as 47 are stored in FIFO 46 when the channels reappear at the input of the pilot CBT 14 after propagation around the BT 10. The delay introduced by each slave CBT 11 between reception and retransmission of a channel is 400 ns. Thus, in a node with p channels and n slaves CBT, the transmission delay between separate frames is given by the formula: $T_d = 600\ p - (400\ ns + \beta)$, where $T_d$ is the delay in ns required for correct retransmission of a frame by the pilot CBT, and $\beta$ is the total transmission delay encountered on the BT 10, typically less than 200 ns in a node with a maximum length of 30 meters. Channel words stored in 46 are emitted on output lines, shown as 48, simultaneously with the channel words being received on 47. Consequently, the storage capacity of FIFO 46 is chosen to match the magnitude of the required delay $T_d$. In this fashion frames can be continuously and efficiently retransmitted without any gaps in transmission between frames. Different delays $T_d$ can be easily accomodated for different values of p, n and $\beta$ by altering the storage capacity of FIFO 46. It should be understood that 47 and 48, which also include the synchronisation signals, are part of the channel word transmitted. Initially, FIFO 46 is empty, having been reset to zero by RAZ CBT. Therefore, at initial start up, or after an error condition, the first frame of channels is always empty.

Figure 5:
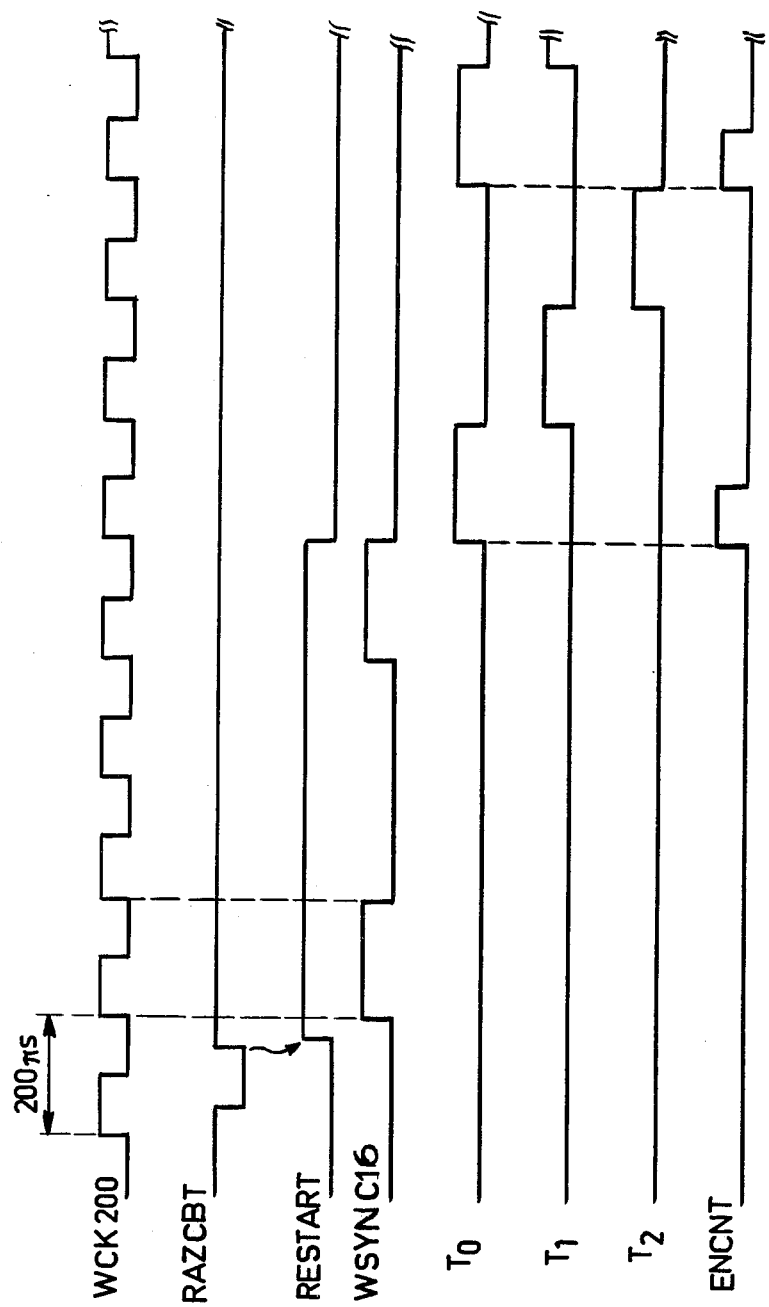
FIG. 5 is a timing diagram showing the relationships between timing signals used by the synchronisation and clock generation system of FIG. 4.

FIG. 5, not drawn to scale, is a timing diagram of the relationships between the principal signals described with reference to FIG. 4. The signal RAZ CBT, if active, overrides all other signals and resets to zero the elements 40 and 50, which remain in an inhibit state, and sets RESTART to 1. RESTART remains set to 1 up to the end of the first frame synchronisation SYWNC 16, as described.

Thus, FIG. 5 shows the initial frame generation by a pilot CBT. In the case of a slave CBT, WSYNC 16 may arrive at a later time, dependent on the position on the slave CBT 11 in the loop.

FIG. 6 is a logic block diagram of a slave CBT 11 input interface 31 with the BT 10. Henceforth a slave CBT 11 is referred to as CBT, unless a pilot CBT 14 is explicitly described. Data channels from the BT 10 arrive on the input of the CBT 11 in the described format and are clocked into 16 bit input buffer registers 60, 61 and 62 by timing signals $T_0$, $T_1$ and $T_2$ respectively. An error correction PROM 63 (programmable read only memory) acts on the occupation bit received OK(R), the origin code received COR(R), and the error correction code received CCE (R). If these are incorrect, 63 corrects them according to the defined error correction code; if not correctable, a fault signal FTC is activated which causes an error condition to be transmitted on the BT to the controlling DSCU. A channel counter 64, enabled by the EN CNT signal from element 50, keeps count of the number of channels transmitted on the BT, its outputs CNO specifying the current channel number received by the CBT. CNO is input to a PROM 65 which contains the channel numbers assigned to the CBT. If the current channel number as defined by CNO coincides with the channel number stored in 65, a signal AP which defines that the current channel is assigned to the CBT is activated; otherwise AP remains inactive. The contents of the PROM 65 may be altered by reprogramming or replacement.

The corrected origin code COR(C) from 63 is compared with the wired internal code COR(I) of the CBT in comparator 66. COR(I) is connected to either OV or +V, as required, via connector 68 to give the appropriate code. If COR(C)=COR(I), the control signal MCOD is activated which, in conjunction with control signals AP and EM, is used to determine if the CBT is the originator of the transmission on the channel. The precise utilisation of the various signals will become clear in the description of FIGS. 11 to 13 relating to control and synchronisation of the various CBT sequences.

The COR(C) and CNO bits are combined in PROM 67 to determine the 6 bit origin address ORAD. This address has the following format:

| b5 | b4 | b3 | b2 | b1 | b0 |
|----|----|----|----|----|----|
| 0  | X  | X  | X  | X  | X  |

The bits b0–b2 define the actual value of COR(C). The bits b3 and b4 are provided by PROM 67, while bit 65 is always 0.

Figure 7:
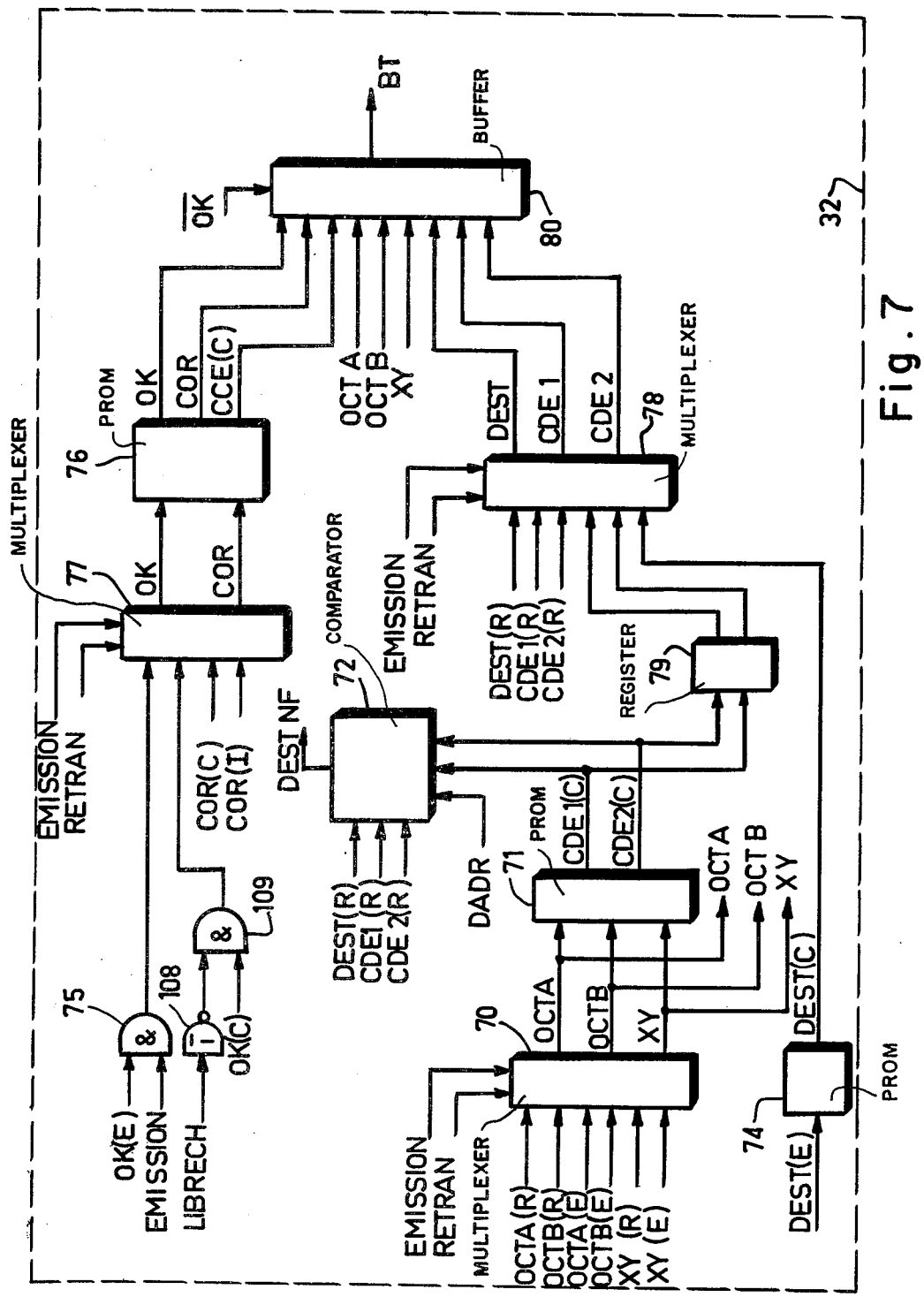
FIG. 7 is a logic block diagram of the output interface, with the time bus, of a time bus connector.

FIG. 7 is a logic block diagram of the CBT output interface 32 with the BT. Various data, received either from the BT via the CBT input interface 31 or emitted from the CBT itself, are input to a series of multiplexer elements 70 which are controlled by control signals. In the case of retransmission of a channel received from the BT via the input interface 31, the element 70 selects inputs OCTA(R), OCTB(R) and XY(R) which are data received, while if the decision is to emit a message, inputs OCTA(E), OCTB(E) and XY(E) are selected. These selected inputs are output via 70 to PROM 71 which calculates the error detection codes CDE1(C) and CDE2(C) as a function of the OCTA, OCTB and XY data. In the case of a channel emitted by the CBT, the CDE1(C) and CDE2(C) codes generated by 71 will be transmitted on the BT. In the case of a received channel, where the CBT is the destination, CDE1(C) and CDE2(C), together with the wired destination address DADR of the CBT, are compared with the received error detection codes CDE1(R) CDE2(R) and the destination address, respectively, received in comparator 72. A destination without fault control signal DESTNF is activated if the result of this comparison is correct; otherwise, DESTNF remains inactive, indicating that the channel information is not recognised and must be retransmitted on the BT. In the case of retransmission of a channel received on the BT, the codes CDE1(R) and CDE2(R) are output without alteration via multiplexer 78. In the case of an emitted channel, the codes CDE1(C) and CDE2(C), calculated in PROM 71 and stored in a buffer register 79, are transmitted on the BT via the multiplexer 78.

For a retransmitted channel the destination address DEST(R) received is output on the BT via multiplexer 78 without alteration. For an emitted channel, the 6 bit destination address DEST(E) is encoded into a 10 bit destination address DEST(C) in encoding PROM 74 for transmission on the BT via multiplexer 78. When the CBT emits on a channel, the control bit EMISSION, generated by a PROM 99 (FIG. 9) which is microprogrammed to control the various sequences for a free channel received, is used to set to 1 the occupation bit OK(E) for the channel and to store the emission bit (EM) for the channel in the channel memory 96. The two above mentioned signals activate AND gate 75 which in turn causes the occupation bit (OK) to be transmitted as "1" on the BT.

For retransmission or emission of a channel, the signals OK and COR output via multiplexer 77 activate PROM 76 which calculates the Error Correction Code (CCE) for transmission along with OK and COR. Thus, the error correction PROM 63, together with PROM 76 which calculates CCE assures the elimination and accumulation of faults between the stations. The various data either to be retransmitted or emitted by the CBT are grouped together by means of multiplexers 70, 77 and 78, the correct format being controlled by control signals from control elements 34. The output buffer 80 is a 16 bit register with its input connected to OR gates to select the 1st, 2nd or 3rd channel words for transmission on the BT. In some sequences it is necessary to free an occupied channel. This is achieved by control signal LIBRECH from PROM 98 which is inverted in gate 108 and combined in AND gate 109 to force the occupied bit OK(C) to 0.

For all other conditions OK(C) received is not affected. The three channel words are then clocked out at intervals of 200 ns from output buffer 80 by clock signal CK. Timing and control signals are described with respect to FIGS. 11 to 13.

Figure 8:
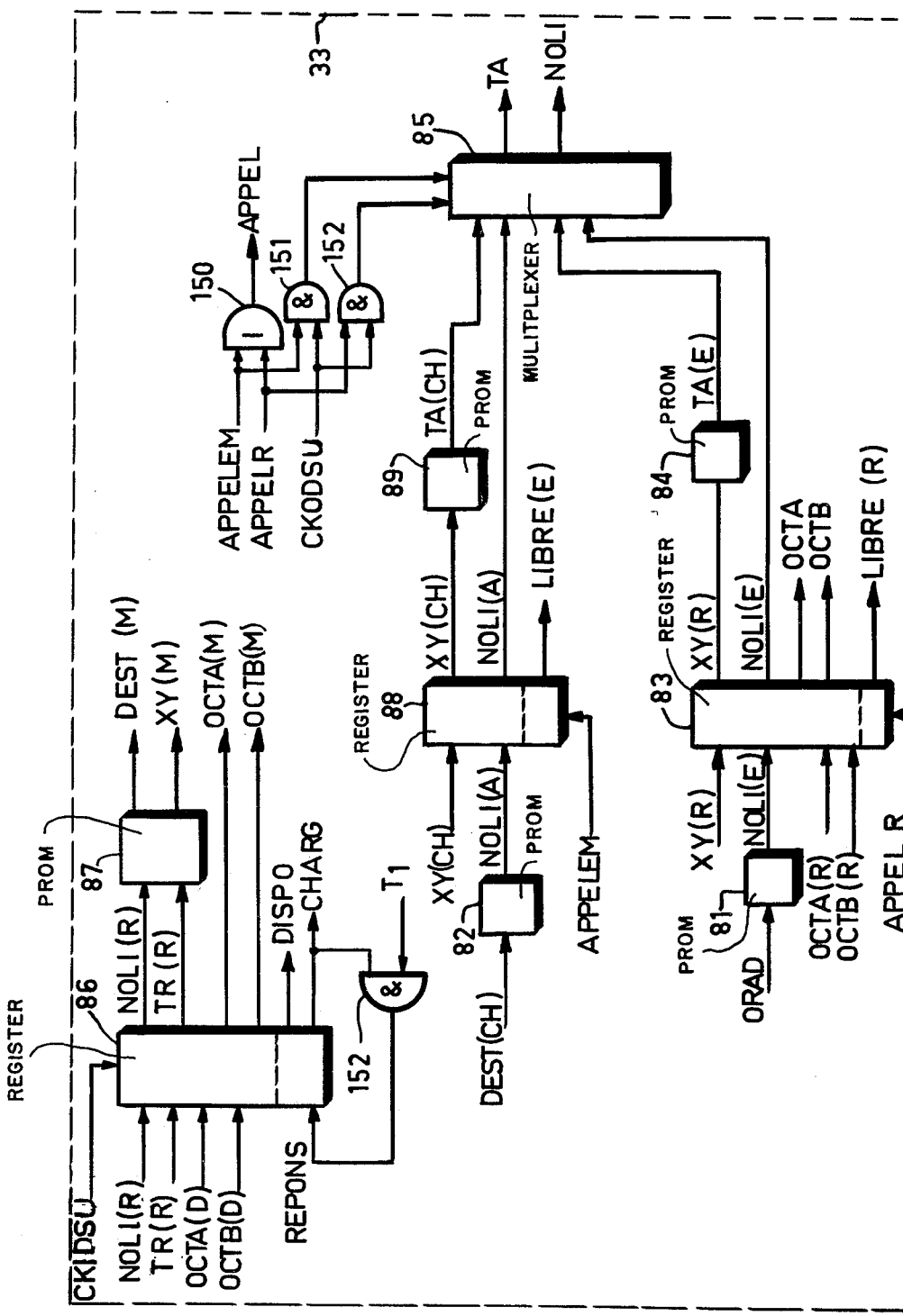
FIG. 8 is a logic block diagram of the time bus connector input/output interface with a Data Switching unit or Data Switching Control unit.

FIG. 8 is a logic block diagram of the CBT Input/Output interface 33 with a DSU. When a channel from the BT is received by the CBT for transmission to a connected destination DSU, it is first transformed and then transmitted on the CBT/DSU data bus in the following format

WORD 1=NOLI(E)+TA(E)

WORD 2=OCTA(R)+OCTB(R)

Here, NOLI(E) is a 9 bit address corresponding to the virtual or fictitious line on which the received data will be transmitted via the connected DSU, and TA(E) is the type of call. The 6 bit address ORAD, calculated in PROM 67 (FIG. 6), is transformed into the 9 bit origin address NOLI(E) in conversion PROM 81 according to the following format in which X is the actual value of the relevant bits. Some bits in NOLI(E) are always 0.

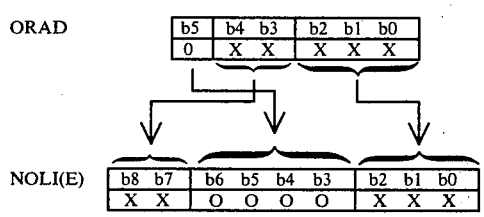

The XY(R) code bits are transformed into TA(E) which has a 5 bit format. The relationship between the two codes is as follows:

| XY(R) | | TA (E) | | | | |
|---|---|---|---|---|---|---|
| X | Y | $\overline{X}$ | Y | $\overline{Y}$ | X | Function |
| 0 | 0 | 1 | 1 | 0 | 1 | 0 | Significant Octets |
| 1 | 0 | 1 | 0 | 0 | 1 | 1 | Start of Message |
| 1 | 1 | 1 | 0 | 1 | 0 | 1 | End of Message |
| 0 | 1 | 1 | 1 | 1 | 0 | 1 | Faults |

The other combinations of the 5 bit TA(E) code are used by a DSU for other programming purposes not connected with the present invention. If the CBT logic control elements 34 determine that the CBT is the correct destination (signal DESTNF active), and if the DSU input register is free to accept the data received (defined by signal LIBRE(R) active), a signal APPELR is generated by PROM 98 in order to store OCTA(R), OCTB(R), XY(R) and NOLI(E) in a 32 bit register (83). As already described, XY(R) is converted to code TA(E) by a PROM 84.

A multiplexer 85 selects the inputs NOLI(E) and TA(E), while the octets OCTA(R) and OCTB(R) are output directly from register 83. NOLI, TA, OCTA and OCTB are transferred as 2 words on the CBT/DSU data bus by control signal CKODSU which is activated in response to signal APPEL. The signal APPEL is a common control signal produced by the combination of signals APPELEM and APPELR in OR gate 150. The signal CKODSU is combined with APPELEM and APPELR in AND gates 151 and 152, respectively, to control either inputs NOLI(R) and TA(CH) in inputs NOLI(E) and TA(E) of the multiplexer 85.

Figure 9:
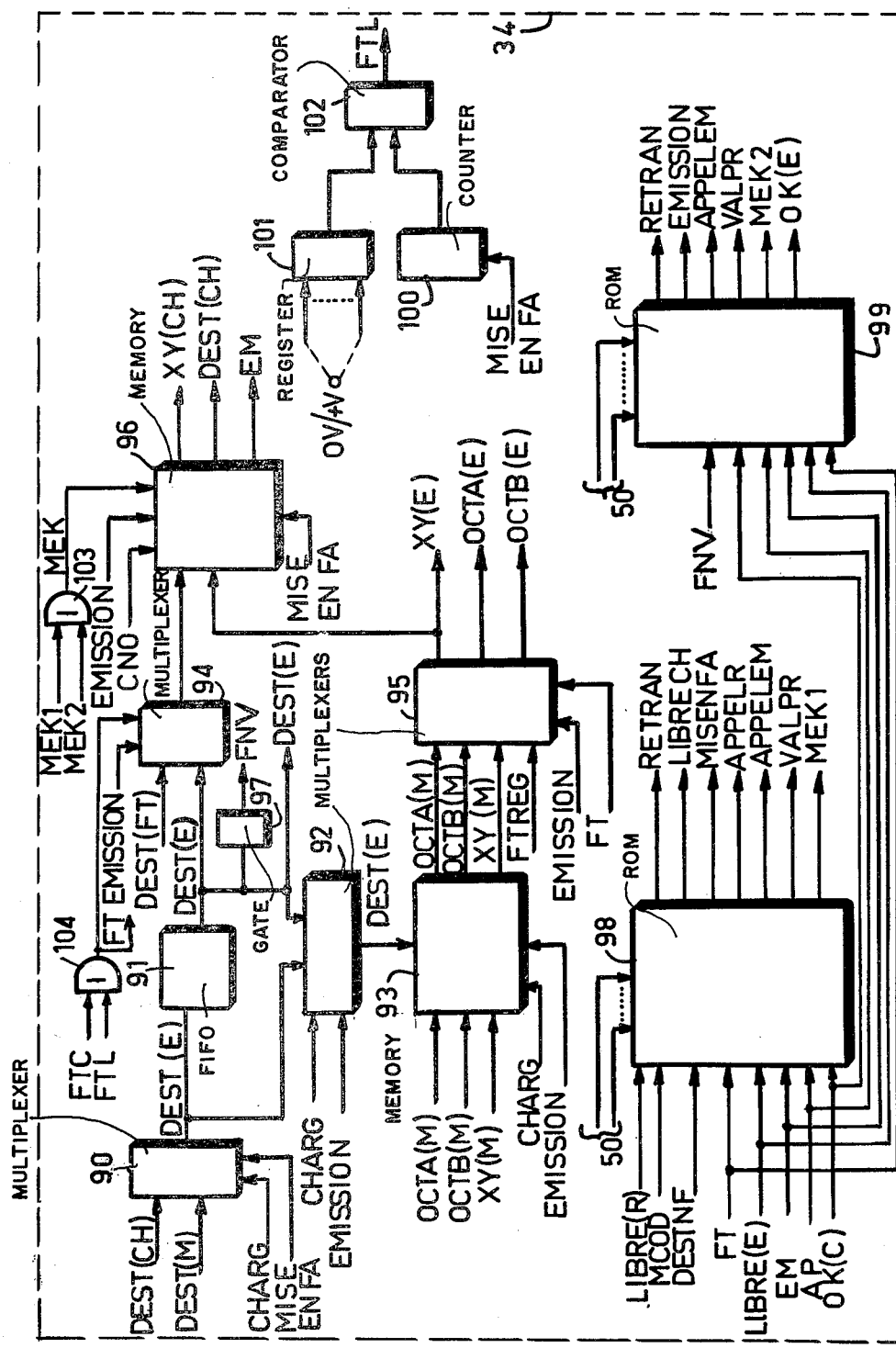
FIG. 9 is a logic block diagram of the control section of a time bus connector.

In the output mode, NOLI(R), TR(R), OCTA(D) and OCTB(D) are received from a source DSU and stored in a 32 bit buffer register 86, via a CKIDSU control signal generated by the source DSU. CKIDSU is activated if the source DSU has data to emit (DDISPE active) and if the buffer register 86 is free. The free state of register 86 is defined by the signal DISPO to the source DSU. Register 86 is available for loading from a DSU when the destination address and data memories of the CBT described with respect to FIG. 9 are loaded via logic control signal CHARG. A signal RESPONS is sent at the first $T_1$ timing pulse to reset to 0 the signal CHARG and to set to 1 the signal DISPO via the element 152.

The information loaded into register 86 has the following format:

WORD 1:NOLI(R)+TR(R)

WORD 2:OCTA(D)+OCTB(D)

where NOLI(R) is the number of the virtual line which is the destination of the message (destination DSU or DSCU), TR(R) is the type of response emitted by the DSU/DSCU, and OCTA(D) and OCTB(D) are data to be emitted.

The 9 bit NOLI(R) address is transformed into a 6 bit destination address DEST(M) to be memorised and the 2 bit TR(R) code is transformed into a 2 bit code XY(M) to be memorised by means of conversion PROM 87. The format is as follows:

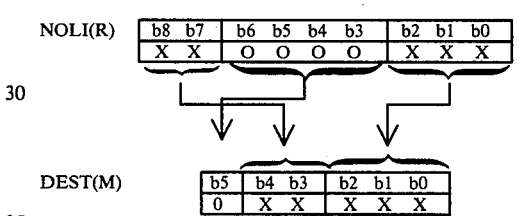

Here X represents the actual variable value that the relevant bits can assume.

The relationship and the functions of the TR(R) and XY(M) codes are given below:

| TR(R) | | XY(M) | | |
|---|---|---|---|---|
| 0 | 0 | 0 | 0 | Octets of data |
| 1 | 0 | 1 | 0 | Start of Message Buffer |
| 1 | 1 | 1 | 1 | End of Message |

After emission on a channel, when the channel used returns during the following frame, it is monitored to determine if the previously emitted message was accepted or refused by the destination CBT. This is defined by the state of signal MCOD which is either active or inactive.

In the case of an accepted emission, the CBT calls the origin DSU. The calling format is as follows:

WORD 1:NOLI(A)+TA(CH)

WORD 2:Not significant

NOLI(A) and XY(CH) originate in the channel memory 96 and are stored in register 88 under the control of APPELEM, which is generated either by PROM 98 or PROM 99 (FIG. 9) if register 88 is free. This information is transmitted to PROM 98 and 99 by signal LIBRE(E).

NOLI(A) is produced by the transformation of DEST(CH). The transformation is identical to that described for ORAD→NOLI(E) and is performed by PROM 82.

The code XY(CH) stored in 88 is transformed to the 5 bit TA(CH) code in PROM 89, the relationship of XY(CH) and TA(CH) being the following:

| XY(CH) | | TA(CH) | | | | | Function |
|---|---|---|---|---|---|---|---|
| 0 | 0 | 0 | 0 | 0 | 0 | 0 | Demand for next emission from DSU source/(start of message Buffer). |
| 1 | 0 | 0 | 0 | 0 | 0 | 0 | Demand for next emission (Date significant). |
| 1 | 1 | 0 | 1 | 0 | 0 | 1 | Free source DSU (End of message). |

XY(CH) of course depends on the XY(M) code and hence the TR(R) code sent by the DSU source.

As before, the DSU transfers the information present at the input of multiplexer 85 via control signal CKODSU. Thus, depending on the condition of the XY code, the emitted channel, if accepted by the destination, is validated, that is either a demand for the next emission is made or the DSU source is freed if it is the end of the message.

If the emitted channel has not been accepted by the destination, control signal MCOD active, the control members inhibit signal APPELEM and, therefore, validation of the emission to the DSU source. Without validation of previous emission, the DSU source is inhibited from emitting to the same destination. In this case the control logic frees the channel and puts the destination address DEST(CH), stored in channel memory 96, into the address file storage FIFO memory 91 (FIG. 9) for reemission at a later time. The DSU source can either wait for validation of the re-emission or can commence communication with another destination if it has information to be transmitted. Each of the elements 83, 86 and 88 includes logic to generate control signals as functions of their inputs.

FIG. 9 is a logic block diagram of the control logic interface 34 of the CBT. The OCTA(M), OCTB(M) and XY(M) bits received from a source DSU are loaded into data memory 93, while the DEST(M) bits are loaded into destination file memory FIFO 91; this occurs under the command of control signal CHARG which selects the correct inputs of multiplexers 90 and 92. Under control of CHARG the DEST(M) input to multiplexer 90 is selected and as output DEST(E) which is loaded into FIFO 91, while OCTA(M), OCTB(M) and XY(M) are loaded into an address in Data memory 93, corresponding to the DEST(E) address, via multiplexer 92. AND gate 97 detects when the contents of 91 are non-zero by means of control signal FNV, (FIFO not empty). Thus the CBT can occupy an assigned and free channel for emission on the BT if FNV is active. In this case the DEST(E) output from FIFO 91 is loaded into the channel memory 96 via multiplexer 94 under the control of EMISSION. Simultaneously, the data XY(M), OCTA(M), and OCTB(M) in data memory 93 corresponding to the address DEST(E) is selected via multiplexer 92 for output under the control of EMISSION; these data are selected via multiplexer 95 for emission on the output interface 32, the code XY(E) being simultaneously loaded in channel memory 96.

In channel memory 96 a bit EM is set to 1 indicating that emission has occurred on the channel specified by CNO, which is also loaded into the channel memory 96.

When the channel used returns and if the emission has been accepted by the destination CBT and if the successful emission can be validated to the source DSU, a control signal MEK from microprogrammed control ROM 98 or 99 (MEK1 or MEK2) will reset EM to 0 through OR gate 103. If the emission is not accepted by the destination CBT, the address DEST(CH) stored in channel memory 96 is restored in FIFO 91 via multiplexer 90 under the control of signal MISENFA (put into wait file). The data in data memory 93 is not effected and remains stored until re-emission occurs. Simultaneously with DEST(CH) being restored in FIFO 91, a counter 100 is incremented by 1 each time when the signal MISENFA is activated. The counter value is compared in comparator 102 with a pre-set maximum value in a register 101. If the two compared values are equal, a limit fault signal FTL is activated by comparator 102. During either a limit fault sequence or during a fault sequence due to other causes, the fault address of the DSU, DEST(FT), which has priority over data transmission, is selected via control signal FT produced through OR gate 104 from FTC (CCE fault) and FTL (limit fault).

Simultaneously, the fault information FTREG, which is loaded into a fault register (not shown in FIG. 9) is selected for transmission on the BT via output interface 32 and multiplexer 95.

The message will be transmitted with priority to the controlling DSCU before all other messages whose destination addresses are in FIFO 91 when the CBT detects a free channel on which it can transmit the fault information.

The DSCU can then take appropriate system action such as to ascertain the exact cause of the fault. The pre-set value in the register 101 can either be hard-wired at OV or +V or be manually programmed via the control panel of the node.

In the case of a successful emission, it should be realised that the relevant data in data memory 93 will be overlaid during the following emission by the source DSU.

The CBT only asks for a further emission by the source DSU when the previous emission has been successful. Thus, data pertaining to several destinations can be simultaneously buffered in the data memory 93 and controlled by the destination address memory FIFO 91. This simultaneous buffering of data for several destinations significantly enhances flexibility, throughout and therefore efficiency of a node.

The microprogrammed PROMs, channel occupied decision PROM 98 and channel free decision PROM 99, provide the appropriate control signals for the various CBT sequences as a function of the state of their inputs. The definition of all signals is given in the Annex I.

Figure 10A:
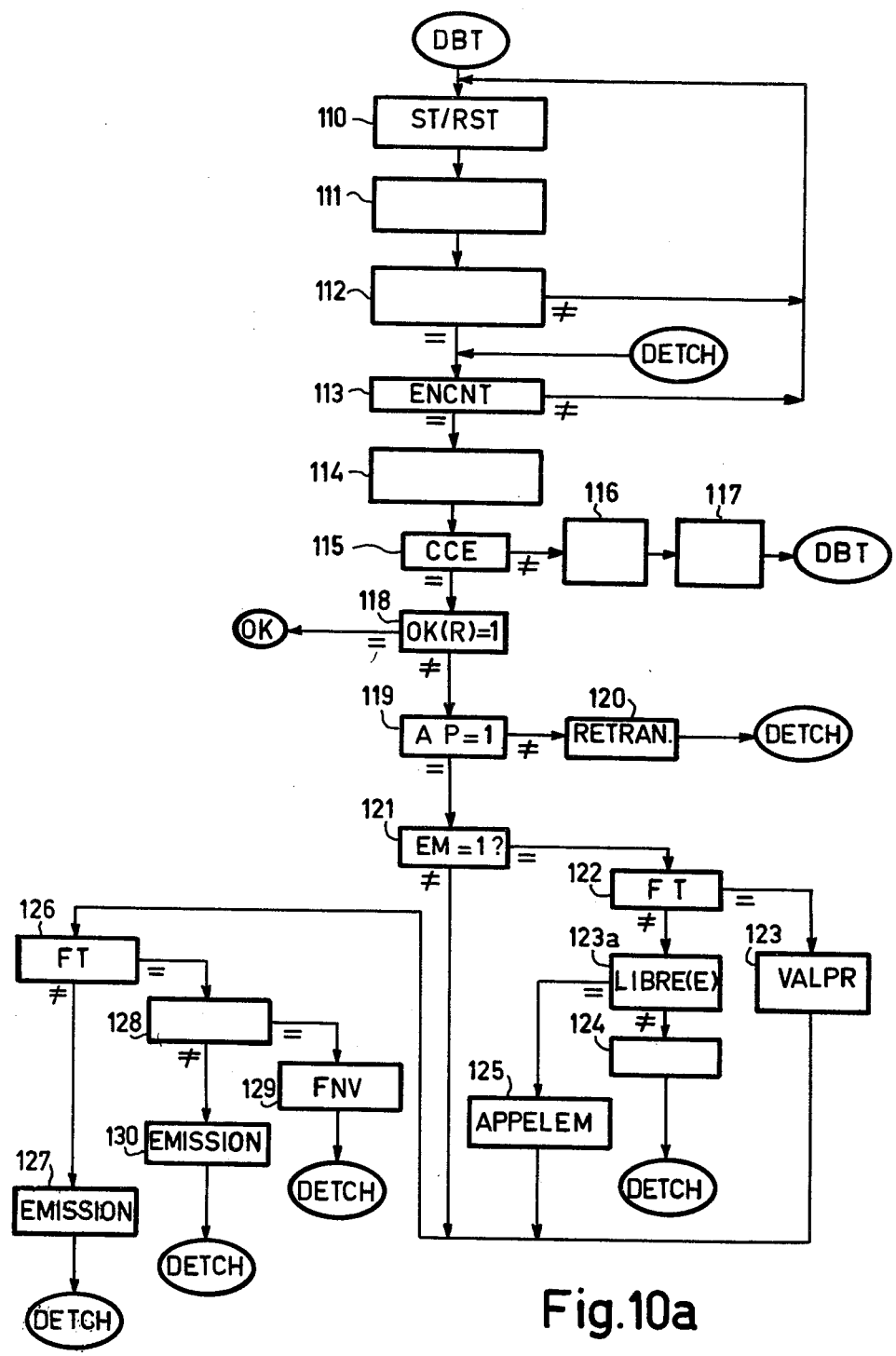
FIGS. 10a and 10b are connected flow charts showing the logic sequences of time bus connector operation in a data switching node.
Figure 10B:
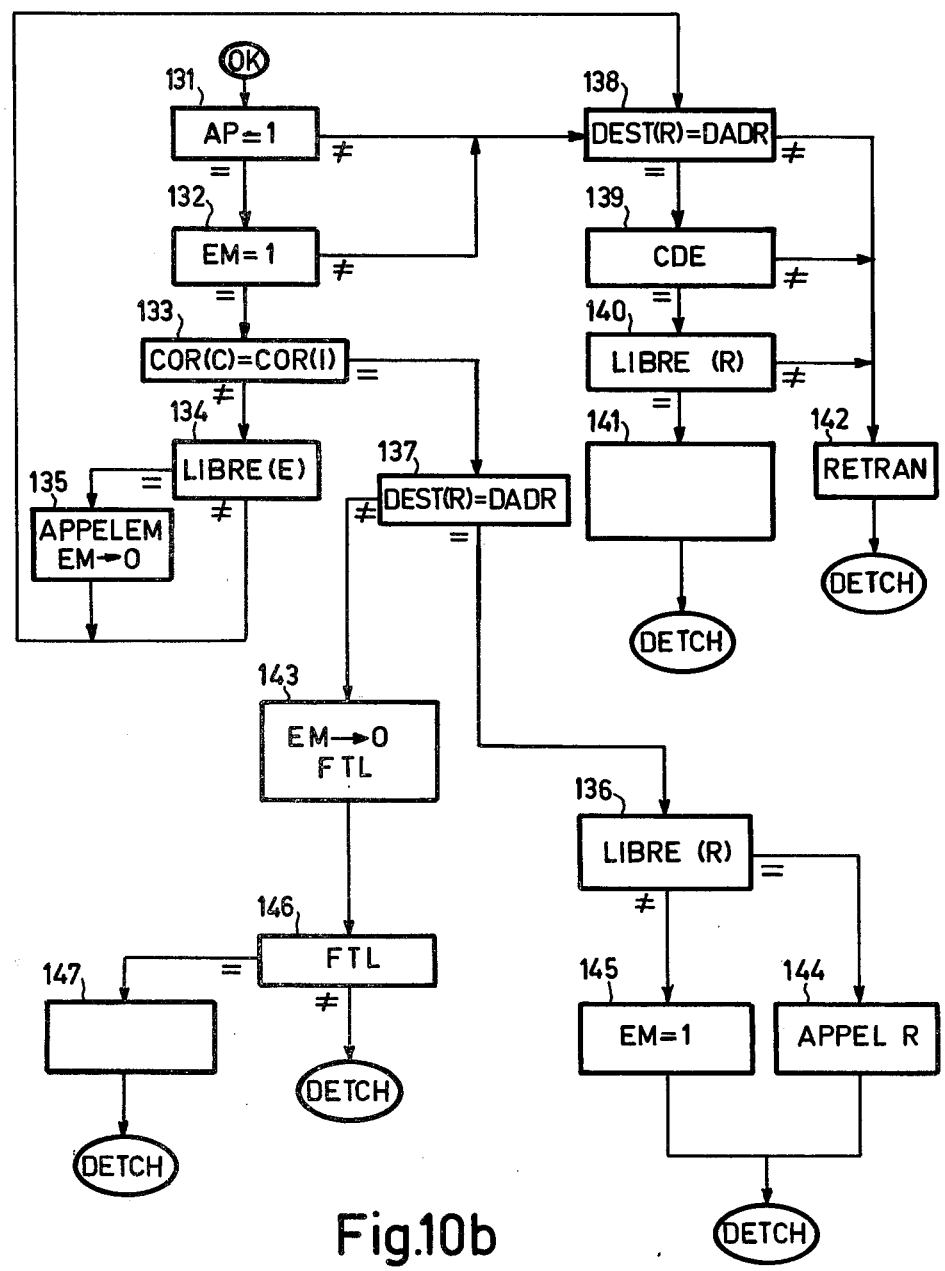

The modes of operation for all CBT sequences are described with respect to the flowchart of FIGS. 10a and 10b, and the already described diagrams of FIGS. 4 to 9. In the following description reference to FIGS. 10a and 10b are implicit unless explicit reference is made to other figures. Synchronisation and control for correct CBT operation are described with respect to FIGS. 11 to 14.

In FIG. 10a, 110 represents the initial start up or a restart after a reset to zero of the switching node of FIG. 1, this sequence being illustrated in FIG. 5. During this phase the RESTART signal, which follows the RAZCBT signal, causes the pilot CBT 14 to generate the first frame of channels for transmission on the BT, shown as 111. If the slave CBT 11 detects generation of the frame via signal WSYNC 16 (FIGS. 4 and 5), it emits a sequence to detect channels in the following frame via activation of ENCNT. If the frame is not detected, the CBT takes no action and the sequence returns to start, shown as block 112 and DEBUT, the sequence being repeated until detection of the frame occurs. Detection of the frame enables channel detection via WCK 200 (FIGS. 4 and 5), and the channel counter 64 (FIG. 6) is started by timing signal $T_O$ which has been enabled by ENCNT. This is shown as block 113. Detection of a channel and generation of timing signals by signal generation element 50 in FIG. 4 causes the 1st, 2nd and 3rd channel words to be loaded into the CBT input buffers 60, 61, 62 (FIG. 6), this being shown as 114. The CCE(R) is examined in PROM 63 (FIG. 6) to determine its validity, shown as 115. If it is not valid and cannot be corrected, fault signal FTC is generated. The error is transmitted on the BT to the controlling DSCU, which executes a general re-initialisation of the time bus, as shown in blocks 116 and 117, a return being made to DEBUT.

If the code CCE(R) is valid, or is correctable, the OK(R) bit is examined, shown at 118, to determine if it is set to 1 or not. If set to 1, the channel is occupied and a sequence of actions for an occupied channel is initiated. If OK(R) is received set to 0, a sequence of operations for a free channel occurs.

The AP bit from PROM 65 (FIG. 6) is examined, block 119, and if inactive, the channel is not assigned to the CBT and is retransmitted on the BT exactly as received, block 120, the PROM 99 (FIG. 9) providing the necessary control signals. In this case a branch is made to DETCH, that is the sequence returns to a position where the detection of channels can recommence. If the AP signal is active, the channel is assigned to the CBT and the EM bit from channel memory 96 (FIG. 6) is examined to determine whether the CBT has previously emitted on the channel, shown as block 121. If there is an emission on the channel (EM active), signal FT is checked to determine if the emission pertains to fault information or data transmission, shown as block 122. If the current emission is fault information, a fault validation signal VALPR is sent to the source DSU and the channel memory is freed, block 123. The fault validation signal VALPR is always accepted by the source DSU. Freeing of the channel memory causes MEK to reset EM to 0 in the channel memory 96.

If the emission was not a fault but data transmission, the communication register (88) with the source DSU is checked to determine if it is free (LIBRE(E) active) shown as block 123(*a*). If LIBRE(E) is inactive, that is, DSU communication register 88 is not free, the CBT takes no further action, block 124, and a branch is made to DETCH. Implicitly this means that the channel, when it returns during the next frame, will cause a test of the communication register 88 to determine if it is free; meanwhile the source DSU is inhibited from emitting any further data to the same destination due to lack of validation of the previous emission. If the DSU register is free, a validation of the previous emission is given via APPELEM generated by PROM 99 and the channel memory 96 freed, shown as block 125. OK(R)=0 then indicates that the previous emission was accepted by the destination. Each of the sequences 121, 123 and 125 which EM reset to 0 causes the fault register to be examined, block 126, and if is not empty (FT active), the fault information is emitted on the BT under the control of PROM 99 as described with respect to FIG. 9 and shown as 127. If the fault register contents are zero, FIFO 91 (FIG. 9) is examined, block 128, and if it is empty, indicated by FNV being inactive, no further action is taken (block 129), a branch then being made to DETCH. If FNV is active, the channel occupation bit OK(E) is set to 1, channel memory 96 is loaded and data are emitted as described with respect to FIG. 9, shown as block 130. This sequence occurs under the control of PROM 99, a branch again being made to DETCH.

If OK(R) is set to 1 in block 118, the channel occupied sequence (OK) shown in FIG. 10b is selected. During this phase it is necessary to determine if the CBT is the destination or the source of the transmission or neither. Once again the AP bit is tested to determine if the channel is assigned to the CBT, 131. If yes, the EM bit is tested as before to determine if there is a current emission on the channel, shown as block 132. If EM is active, the code COR(R) is compared with the code COR(I) in the comparator 66 (FIG. 6) shown as 133. If the output MCOD of 66 is inactive, the two codes are different and that the emission has been accepted by the destination. The DSU communication register 88 is then checked, blocked 134, and if it is free (LIBRE(E) active), the successful emission is validated as described before, the channel memory 96 is freed, shown as 135, and a branch is executed to block 138. If the DSU communication register 88 is not free, validation is withheld and a branch is executed once again to block 138.

If the code test in block 133 indicates that COR(R)=COR(I), MCOD active, the destination address received DEST(R) is checked against the CBT hardwired destination address DADR, block 137. If the two addresses are the same (DESTNF active) the CBT was emitting to itself for test purposes. In this case the DSU input register 83 is tested as shown in 136, and if it is free, LIBRE(R) active, the PROM 98 generates the control signal APPELR, the channel being freed at the same time. The channel memory 96 stores the EM bit set to 1 for the necessary validation of the emission at a later time if LIBRE(R) is inactive. These sequences are shown as 144 and 145. In either case a branch is made to DETCH at the end.

If in test 137, DEST(R)≠DADR, DESTNF is inactive, the emitted message has not been accepted by the destination. In this case the destination address DEST(CH) from channel memory 96 is re-stored in FIFO 91 under the control of MISENFA, the channel memory 96 freed and simultaneously the limit check FTL on the number of re-emissions carried out, this being shown as 143. If the limit check FTL indicates that the pre-set maximum limit for re-emissions is reached in block 146, the fault information is sent on the BT to the controlling DSCU, block 147, as a priority message. In either case 146 a branch is made to DETCH.

If the channel is not assigned to the CBT in block 131, or if the CBT has not emitted on the channel, block 132, the channel destination address is checked against the CBT hardwired destination address, test 138. This occurs in address comparator 72 (FIG. 7), the DESTNF signal being activated if the two addresses are the same. The code CDE is checked for validity, test 139, that is, the calculated values from PROM 71 are compared against the values received in comparator 72 (FIG. 7). If CDE is correct, the destination DSU input register 83 is checked for availability, block 140, defined by LIBRE(R) being active. If the register is available, the received message is put into input buffer 83 under the control of APPELR and transmitted to the DSU as previously described with respect to FIG. 8. The channel is freed at the same time. These sequences are shown in block 141, a branch being once again made to DETCH.

If the channel destination address is not the same as the CBT destination address in test 138, or if the received and calculated CDE codes are not the same, test 139, or if the destination DSU input register 83 is not free, test 140, then in each of these cases the channel is retransmitted on the BT without further action by the CBT, block 142, and as before a branch is made to DETCH.

Figure 11:
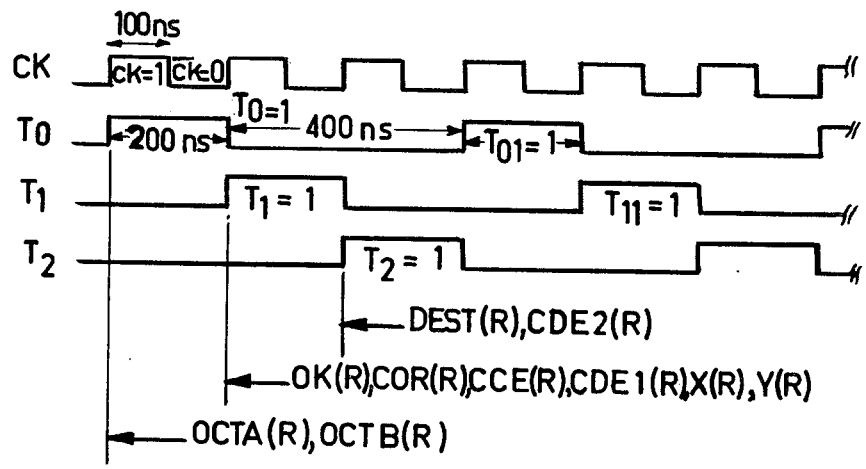
FIG. 11 is a timing and control signal diagram showing the signal sequences for a channel received at the input of a time bus connector.

FIGS. 11 to 14 are timing diagrams (not drawn to scale) describing the synchronisation and timing sequences necessary for correct operation of a CBT. In FIG. 11, the basic clock frequency CK used by a CBT is 5 MHz, that is $CK = 100$ ns and $\overline{CK} = 100$ ns, while the channel word timing pulses $T_0$, $T_1$ and $T_2$ each have active periods of 200 ns and inactive periods of 400 ns. As shown in FIG. 11, the contents of the 1st channel word OCTA(R), OCTB(R), XY(R) are available to a CBT at the start of $T_0$, the contents of the 2nd channel word OK(R), COR(R), CCE(R), CDE1(R) at the start of $T_1$, and the contents of the 3rd channel word DEST(R), CDE2(R) at the start of $T_2$. A channel received is either re-transmitted, that is, sent on the BT exactly as received, or emitted by a CBT, that is, new information is sent on the BT, with a delay of 400 ns. Consequently the 1st channel word is output by the CBT during $T_2$, the second channel word during $T_{01}$ and the third channel word during $T_{11}$ as defined in FIG. 11. For a free channel the information necessary to determine if it is free and assigned to the CBT, OK(R) and COR(C) are only available during $T_1$; therefore, a decision with respect to a free channel can only be made during $T_1$. For an occupied channel, the information necessary to make a decision, DEST(R), CDE2(R), is only available during $T_2$.

For a channel arriving free, a number of decisions are possible, depending on the previous sequence of the CBT with respect to that channel.

(a) The CBT can validate a previous emission on the channel to the source DSU if the emission has been accepted by the destination (APPELEM)

(b) The CBT can validate, to the source DSU, a priority emission such as fault information (VALPR)

(c) The CBT can emit on a free assigned channel on which it has not previously emitted (d) The CBT can emit on a free assigned channel simultaneously with validating a previous emission or a priority message (e) The CBT can re-transmit a received channel without taking any action either because it has not previously emitted on the channel and it has nothing to emit, or because the channel is not assigned.

FIGS. 12a, 12b, 12c, 12d show the most important timing and control signals required for the control and synchronisation of the above defined free channel sequences.

Figure 12A:
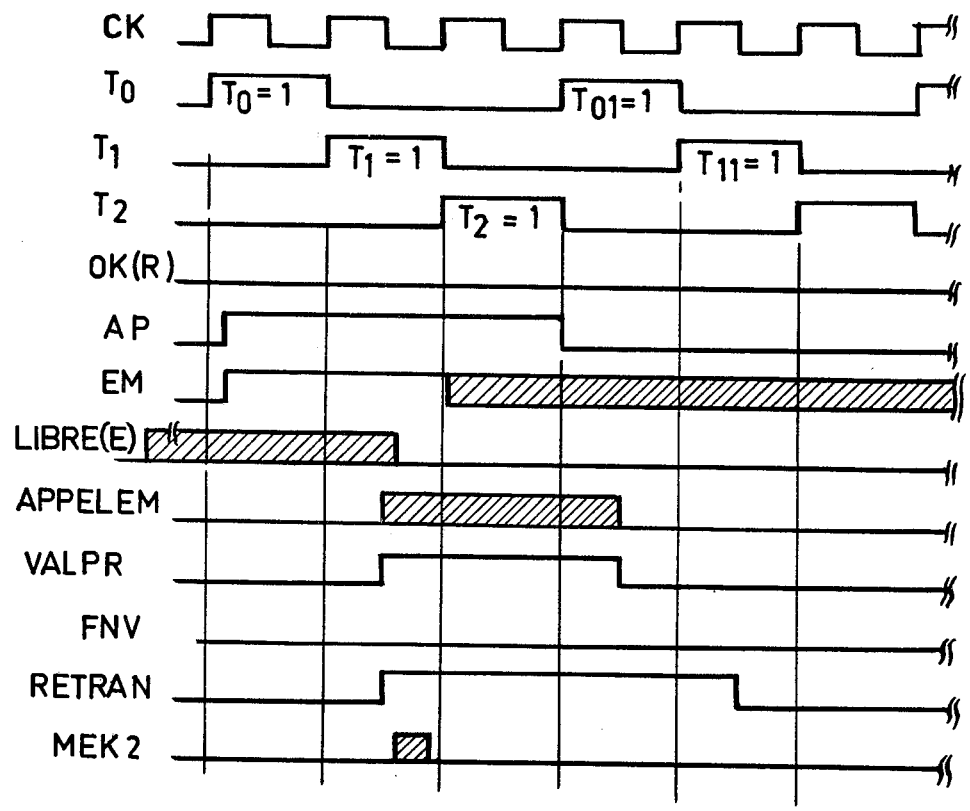
FIGS. 12a and 12b are timing and control diagrams for all time bus connector sequences relating to an unoccupied channel.
Figure 13:
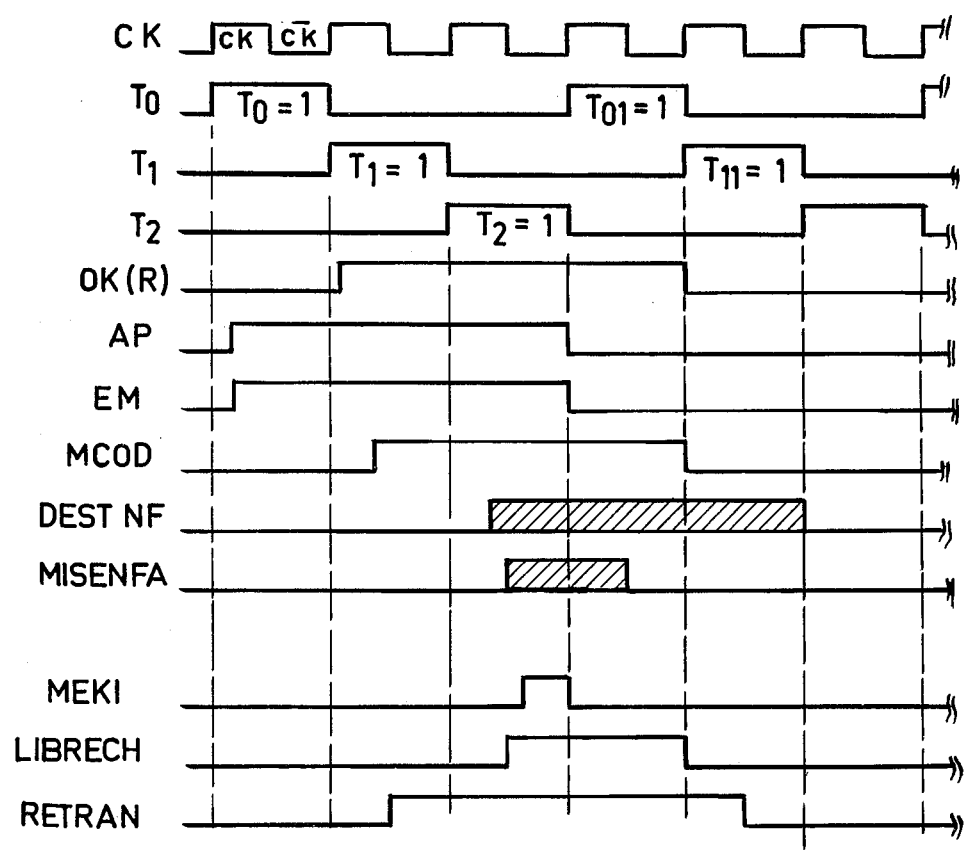
FIGS. 13a to 13e are timing and control signal diagrams for all time bus connector sequences relating to an occupied channel.
Figure 13:
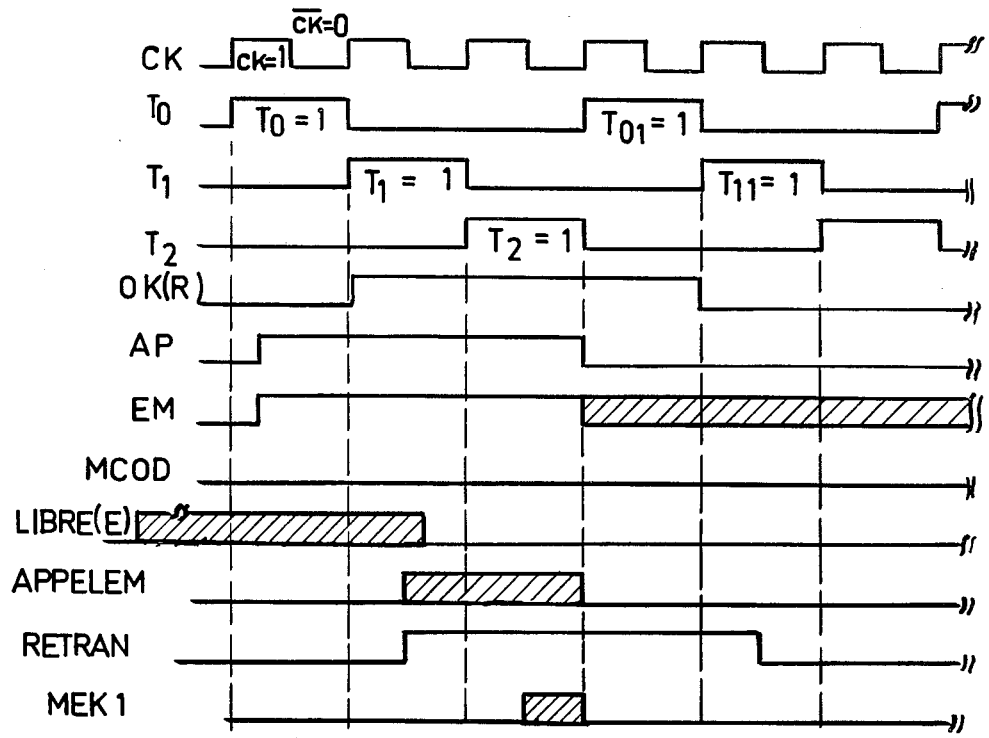
Figure 13:
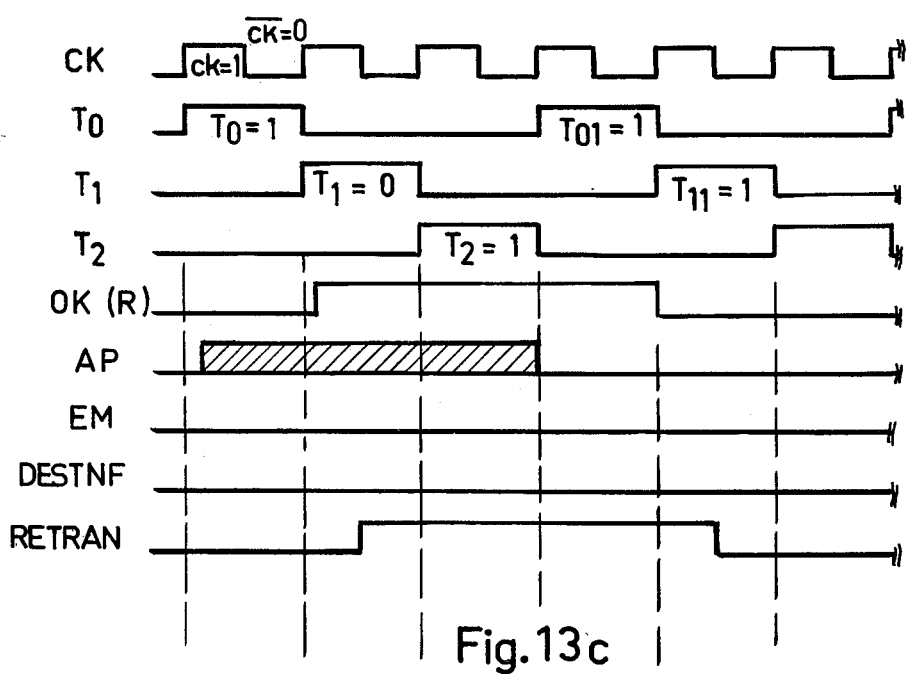

FIG. 12a shows the principal control sequences utilised by PROM 99 for free channel sequences (a) and (b). CK, $\overline{CK}$, $T_0$, $T_1$, $T_2$, $T_{01}$, $T_{11}$ are the necessary timing signals for word input and output. The bit OK(R)=0 is available at the beginning of $T_1$; the AP bit defining channel assignment is activated during $T_0$; the EM bit is set during $T_0$; LIBRE(E) is active to indicate that source DSU communication register 88 is free, and FNV is inactive, which means that CBT has no data to emit. Thus, PROM 99 can take a decision at time $T_1 \cdot \overline{CK}$ to validate the previous emission, defined by EM set to 1, by activating APPELEM, the actual validation occurring as described with respect to FIG. 8. At time $T_1\overline{CK}$, PROM 99 simultaneously activates control RETRAN which controls retransmission of the received channel. Under the control of RETRAN, multiplexers 70, 77, 78 are conditioned to select the received inputs for transmission, each channel word being successively sent to output register 80 and being transmitted on the BT by successive $\overline{CK}$ pulses. Activation of APPELEM causes activation of MEK2 which is a pulsed signal of given length. MEK2 is output via OR gate 103 as MEK and resets EM to 0. If LIBRE(E) is not active, PROM 99 inhibits activation of APPELEM and MEK2 and, consequently, the resetting of EM to 0, shown as shaded areas in FIG. 12a.

Activation of APPELEM resets LIBRE(E) to 0, APPELEM itself being reset to 0 at time $T_{01} \cdot \overline{CK}$, after the validation data has become stabilised in communication register 88. RETRAN is reset to 0 at time $T_{11} \cdot \overline{CK}$ after the last channel word has been stabilised in output buffer 80. It is evident in this case that the retransmission of the channel received has no significance and it is not necessary for the CBT to take any further action, the only important point being that the OK bit transmitted on the BT is 0 to indicate a free channel.

For sequence (b), the activation of AP and EM causes PROM 99 to activate VALPR at time $T_1 \cdot \overline{CK}$, VALPR being always accepted by the source DSU irrespective of the state of LIBRE(E) which is irrelevant in this sequence. All other signal activation and resetting is identical to that of sequence (a).

Figure 12B:
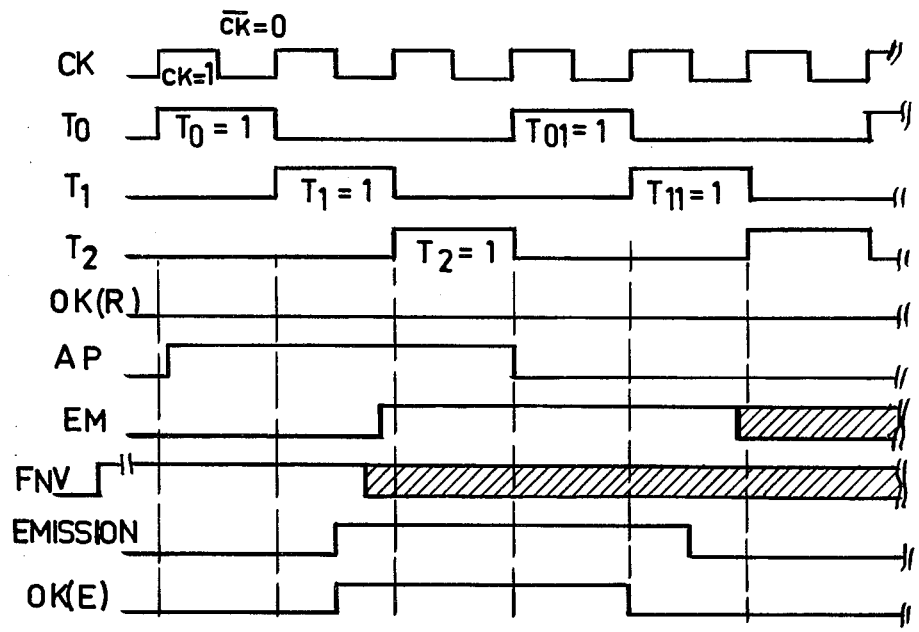

FIG. 12b shows the synchronisation and control for sequence (c); OK(R) and AP are as before, EM is 0, indicating no previous emission pending, FNV is active, indicating the FIFO 91 is not empty and thus that the CBT has permission to emit.

In these circumstances PROM 99 activates control signal EMISSION at $T_1 \cdot \overline{CK}$, while simultaneously setting channel occupation bit OK(E) to 1, this bit being emitted on the BT in the second channel word. Under the control of EMISSION, the channel memory 96 is loaded with the destination address DEST(E) and the code XY(E), EM being simultaneously set to 1; at the same time, FNV might be deactivated or remain active, depending on the contents of FIFO 91. Under the control of EMISSION, the data from data memory 93 is output, multiplexers 70, 77 and 78 being conditioned to select the emitted outputs for channel words 1, 2 and 3 which are clocked out to the BT by successive CK signals during $T_2$, $T_{01}$, and $T_{11}$, respectively. PROM 74 is activated by $T_2$. The code CCE(C) is also calculated in PROM 76 during $T_2$, all inputs to PROM 76 having had time to stabilise. As before AP is deactivated at end of $T_2$, EMISSION at time $T_{11} \cdot \overline{CK}$ and OK(E) at the end of $T_{01}$, the bit EM read being that of the channel and either remaining set to 1 or being reset to 0.

Figure 12C:
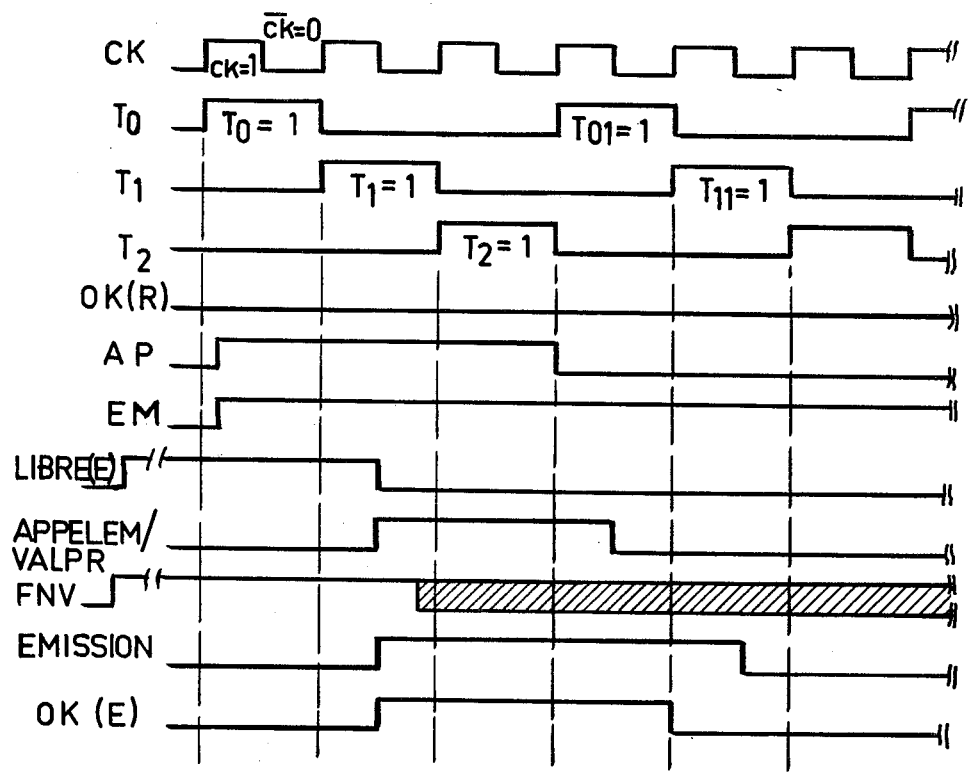

FIG. 12c shows the timing and control for CBT sequence (d). As already described with respect to FIG. 12a, the microprogrammed control sequence of PROM 99 is identical up to the moment that APPELEM or VALPR is activated. However, if FNV is active in this sequence, PROM 99 simultaneously activates EMIS- SION and OK(E), and the sequence for emission on the BT is as described with respect to FIG. 12b. However, the activation of EMISSION causes EM to remain set to 1, and the new destination address together with XY(E) is written into the channel memory 96. Resetting to 0 or deactivation of all signals are as described with respect to FIGS. 12a and 12b.

Figure 12D:
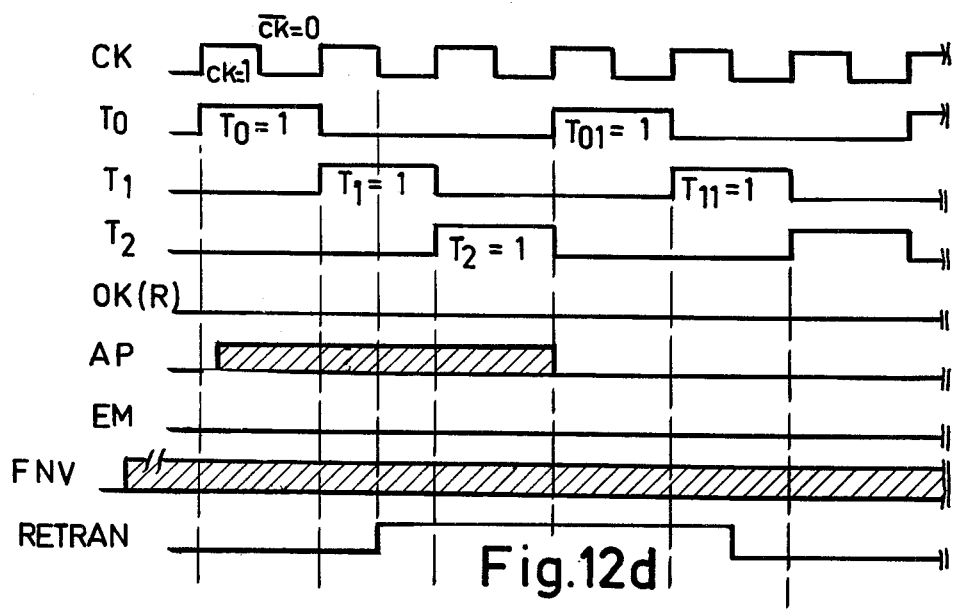

FIG. 12d shows the timing and control for CBT sequence (e). Timing is as previously described. The differences with respect to FIG. 12a are that EM is 0, and either AP or FNV or both are inactive. Thus, RETRAN can be activated by the necessary conditions at $T_1 \cdot \overline{CK}$ as shown in FIG. 12d. Retransmission and resetting occur as in the description of FIG. 12a. As EM is not active, MEK2 is not activated in this case.

The timing diagrams only refer to the channel currently being monitored by the CBT; therefore, resetting to 0 of all control signals is only shown with respect to the current channel. It is evident that signals such as RETRAN and EMISSION must be reset to 0 in time for retransmission or an emission on the following channel, and they are made inactive at the same time. This is easily achieved by setting RETRAN or EMISSION to 1 at time $T_1 \cdot \overline{CK}$ and by resetting the same signals to 0 at time $T_{11} \cdot \overline{CK}$. Consequently, successive retransmissions leave RETRAN set, successive emissions leave EMISSION set, while alternate retransmissions and emissions set and reset the appropriate signals so that they are not active simultaneously.

For a channel arriving occupied, the following CBT sequences are possible;

(a) The channel is assigned, CBT has previous emission pending on channel, emission has not been accepted by the destination; therefore, put into wait file for re-emission and free channel.

(b) The channel is assigned, pending emission is successful, source DSU communication register 88 is free; therefore validate successful emission to source, reset channel memory, retransmit received channel on BT.

(c) Same as sequence (b), but source DSU communication register 88 not free; consequently, inhibit validation of successful emission to source DSU and retransmit channel on BT.

(d) Channel either not assigned to CBT or assigned but no previous emission pending on channel, CBT is not the destination; therefore, retransmit channel on BT.

(e) Identical to sequence (d), however CBT is destination and code CDE is invalid; thus, retransmit channel on BT.

(f) Identical to sequence (e), however, the code CDE is valid and destination DSU input register 83 is busy; therefore, retransmit channel on BT.

(g) Same as sequence (f) with destination DSU input register 83 free; consequently, record message and free channel.

FIGS. 13a–13e define the most important timing and control signals required for the channel occupied sequences described above. The channel occupied decision logic PROM 98 controls these sequences. Because the destination address DEST(R) and the error correction codes CDE1(R), CDE2(R) received are only known to the CBT at $T_2$, the decision to free the channel can only be taken at $T_2 \cdot CK$. This excludes simultaneous liberation and emission on the same channel during the same frame.

FIG. 13a shows the principal timing and control signals for sequence (a). Timing of a received channel is as already described. The channel occupied bit OK(R) is available at the beginning of $T_1$, AP and EM being activated as before. The control signal MCOD is activated by comparator 66 during $T_1$ and defines whether COR(C) is equal to the CBT internal code COR(I). It is then necessary to compare the destination address received DEST(R) with the CBT hard-wired destination address DADR in order to determine if the CBT has emitted a message to itself for test purposes, in which case DEST(R)=DADR. If DEST(R)≠DADR, the emitted message has not been accepted by the destination. Consequently, a decision can only be taken at $T_2 \cdot \overline{CK}$. If DESTNF is inactive, PROM 98 activates MISENFA (put into wait file) at $T_2 \cdot \overline{CK}$. Under the control of this signal, the destination address DEST(CH) in channel memory 96 is loaded into FIFO 91 via multiplexer 90, the data memory 93 remaining unchanged. Simultaneously, MISENFA also increments counter 100 and causes the described limit comparison to be performed. The activation of MISENFA generates MEK1 which resets bit EM to 0.

If DESTNF is activated, indicating that the CBT was emitting to itself, signal LIBRE(R) is tested. In the case where LIBRE(R) is active, the PROM 98 activates APPELR to transmit the received message to the source DSU. The channel is freed at the same time. The signal MEK1 is not activated in order to keep the information relating to the previous emission intact in the channel memory 96. During the next passage of the channel, if LIBRE(E) is activated, the CBT executes the validation sequence for an emission to DSU as described with respect to FIG. 12a.

If LIBRE(R) is not active when tested, the put into wait file procedure is executed as already described. In both cases the signal LIBRECH frees the channel by resetting the bit OK(C) to 0.

The control signal RETRAN is activated as before at time $T_1 \cdot \overline{CK}$ and retransmission of the channel occurs as previously described during $T_2$, $T_{01}$ and $T_{11}$. It is evident that RETRAN must be activated before PROM 98 takes a decision; however, in all channel occupied sequences controlled by PROM 98, the channel can be transmitted before a decision is taken, the only difference being that in some sequences the channel is freed, OK(C) is forced to 0 with the remaining contents being of no significance, while in other sequences the received channel is retransmitted without any change as its contents are of significance. Deactivation of DESTNF occurs automatically at the beginning of $T_2$ of the following channel, deactivation of MCOD occurring at $T_{11}$, and resetting of MISENFA at $T_{01} \cdot \overline{CK}$.

FIG. 13b shows the principal timing and control signals for sequence (b). The channel is received and AP and EM are activated. As MCOD is inactive, defining a successful emission and LIBRE(E) is active, APPELEM is activated together with RETRAN at $T_1 \cdot \overline{CK}$. This causes the successful emission to be validated to the source DSU and retransmission of the channel on the BT as already described. MEK1 is activated as a result of activation of APPELEM, and resets EM, thus freeing the channel memory. Deactivation of signals is as before.

FIG. 13b also describes the timing and control for sequence (c). In this sequence the source DSU communication register 88 is not free; consequently, LIBRE(E) is inactive and APPELEM will not be activated by PROM 98, thus inhibiting validation of the successful emission to the source DSU. Additionally, MEK1 will not be activated, thus inhibiting reset of EM for the channel. Retransmission of the contents of the received channel will occur under control of RETRAN.

FIG. 13c shows the timing and control required for sequence (d). Channel is received as before; AP may or may not be activated, and EM remains inactive. As a consequence, PROM 98 activates RETRAN and retransmission of received channel occurs as before. As DESTNF remains inactive, no further decision is taken by the CBT at T$_2$·$\overline{CK}$; therefore, this sequence causes retransmission of the received channel on BT, to be monitored by the correct destination.

Sequence (e) requires an almost identical timing and control as described with respect to sequence (d). The difference in sequence (e) is that the CBT is the destination; however, comparison of CDE1(R) and CDE2(R) with CDE1(C) and CDE2(C) in comparator 72 is invalid; therefore, DESTNF is inhibited, causing retransmission of the received channel on the BT without further action by the CBT.

Figure 13D:
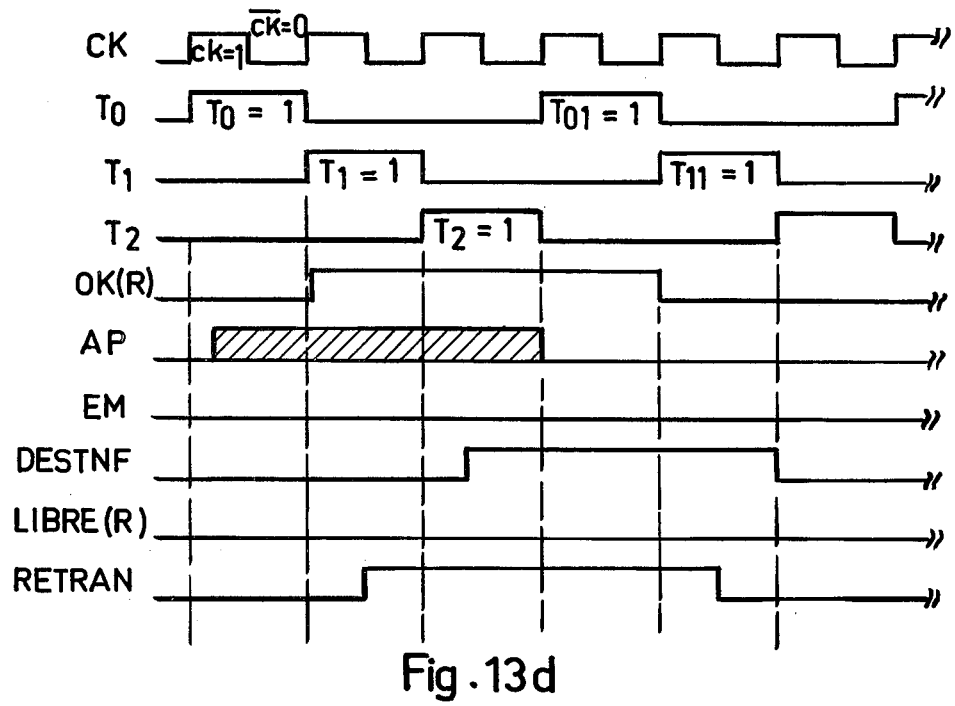

FIG. 13d shows the timing and control necessary for sequence (f). In this sequence, AP may or may not be activated and EM remains inactive, causing PROM 98 to activate RETRAN which controls the retransmission of the received channel. DESTNF is activated when the comparison tests on the destination address DEST(R) and codes CDE1(R) and CDE2(R) are valid. However LIBRE(R) remains inactive, causing PROM 98 to inhibit activation of APPELR, thus no further action is taken by the CBT other than to retransmit the received channel.

Figure 13E:
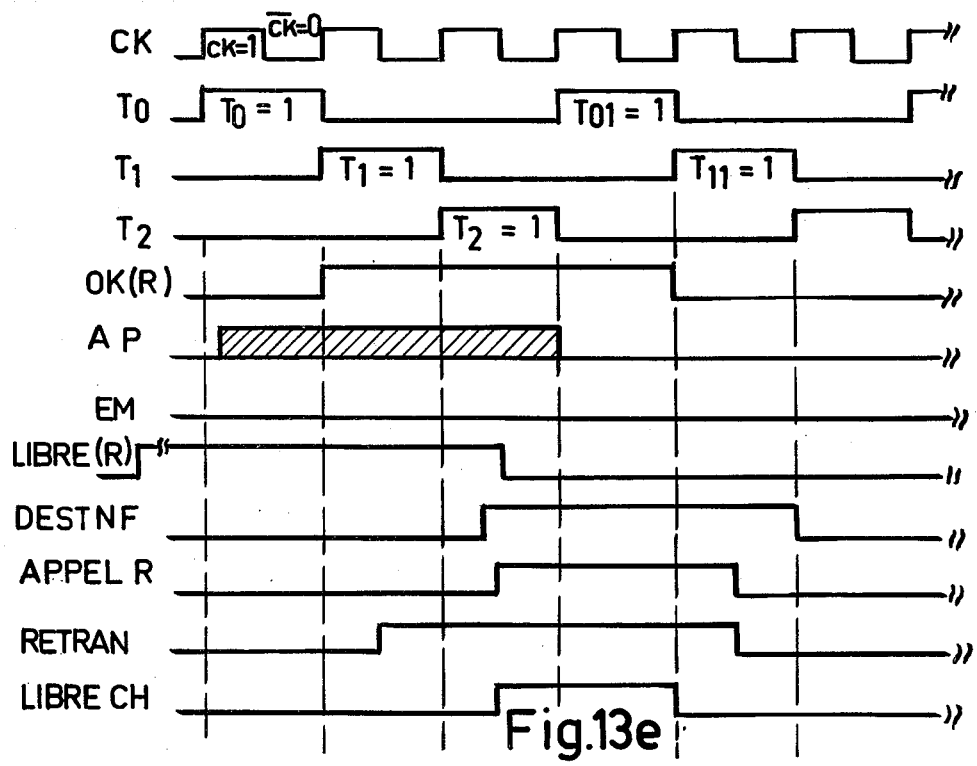

FIG. 13e shows the timing and control necessary for sequence (g). Signals AP, EM and DESTNF are identical to those in sequence (f); however, LIBRE(R) is active in this sequence, causing PROM 98 to activate APPELR at time T$_2$·$\overline{CK}$. Under the control of APPELR, the received channel is stored and sent to the destination as described with respect to FIG. 8 at a later stage. RETRAN, which is activated at T$_1$·$\overline{CK}$, is insignificant in this case. The occupation bit OK(C) transmitted on the BT is reset to 0 by active LIBRECH as described with respect to sequence (a) for an occupied channel. LIBRE(R) is reset by APPELR which in its turn is reset to T$_{11}$·$\overline{CK}$. The other signals are reset or deactivated as described. For a channel received in the occupied state, the sequences (b) and (c) can be combined with the sequences (d), (e), (f) and (g), that is, the sequence combinations (b)(d); (b)(e); (b)(f); (b)(g); (c)(d); (c)(e); (c)(f) and (c)(g) are possible. In each of these sequence combinations, the FIG. 13b, with APPELEM active or inactive, is combined with the relevent control signals of FIGS. 13c to 13e. For example, the sequence combination (b)(g), is described by FIG. 13b in addition to the relevant signals from FIG. 13e, LIBRE(R), DESTNF, APPELR and LIBRECH.

Figure 14:
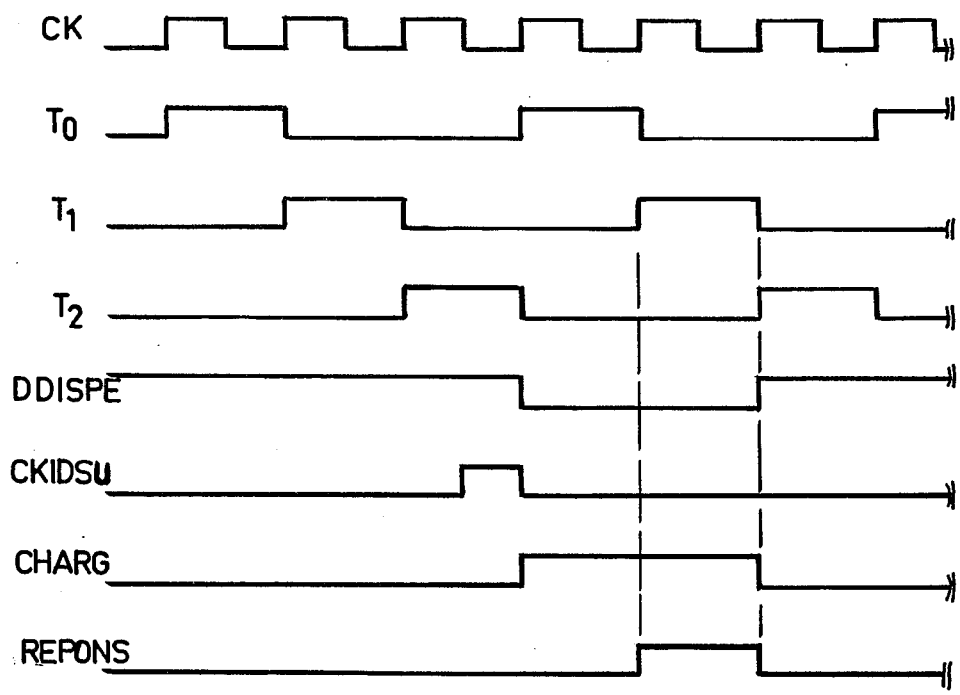
FIG. 14 is a timing diagram for loading of the input buffer of the time bus connector by a source data switching unit.

FIG. 14 is a timing diagram showing the relationships between the control signals which control the loading of the CBT/DSU input buffer 86 in FIG. 8 and the loading of the destination and data memories 91 and 93, respectively, in FIG. 9. If a DSU has data to emit, it activates a control signal DDISPE (Data available for emission), and simultaneously places the data on the output lines of the DSU Data Bus.

The data is stored in register 86 by means of he pulse signal CKIDSU. Simultaneously, the signal CHARG is set to 1, indicating that register 86 has been loaded. When CHARG is set to 1, the contents of register 86 are loaded into memories 91 and 93 and the following timing signal T$_1$ resets CHARG to 0 via the generation of signal REPONS. Signal REPONS is never simultaneously active with EMISSION or MISENFA, which ensures that the CBT memories 91 and 93 are always correctly loaded. DDISPE is controlled by a bistable situated in the DSU system, but this does not form part of the present invention.

What is claimed is:

1. A data switching node for switching data originating from a plurality of source data switching units to a plurality of destination data switching units connected by means of time bus connectors to a looped unidirectional time bus wherein the total information carrying capacity of said time bus is time division multiplexed into a plurality of separate data channels comprising data switching control unit means for the connection of said source and destination data switching units, characterized in that the system further comprises means to simultaneously switch data on said time bus between a plurality of said sources and destinations, said switching means being incorporated in said time bus connectors, each of which comprises:
  (a) source data storage means for data received directly from source data switching units,
  (b) destination address storage means for destination addresses corresponding to said stored source data, said destination address storage being organised in a specified manner corresponding to the sequence in which said source data is to be transmitted on said time bus,
  (c) channel storage means wherein the channel numbers and destination addresses corresponding to data channels currently transmitting said source data are recorded, and
  (d) destination data storage means whereby data received from said time bus data channels is buffered before transmission to the specified destination data switching unit.

2. A system as claimed in claim 1, characterized in that a time bus connector further comprises means to recognise its assigned data channels, said means further determining which of said assigned data channels are occupied and which are unoccupied by other time bus connectors wherein assigned data channels are common to more than one time bus connector.

3. A system as claimed in claim 2, characterized in that a time bus connector further comprises means to seize control and occupy an assigned and unoccupied data channel, said means further inhibiting a time bus connector from occupying said data channel if it is not assigned to the time bus connector attempting to seize control, or if it is occupied by another time bus connector, or if said time bus connector has no data to emit.

4. A system as claimed in claim 3, characterized in that a time bus connector further comprises means to detect if source data emitted by itself has been accepted or ignored by the destination time bus connector.

5. A system as claimed in claim 4, characterized in that a time bus connector further comprises control means to initiate the next data transmission defined by its destination address storage when said previously transmitted data has been accepted by the destination time bus connector, the validation of said successful data transmission being sent to the source data switching unit, the data contained in the source data storage being erased by any further data originating from the source data switching unit.

6. A system as claimed in claim 4, characterized in that a time bus connector further comprises control means whereby, in the case of unsuccessful data transmission, the data contained in the source data storage are preserved and the destination address of said unsuccessful data transmission is re-written into the destination address file storage, the relevent data channel being freed and the source data switching unit being inhibited from further transmission of source data to said destination, said means inhibiting validation of data transmission to the source data switching unit.

7. A system as claimed in claim 6, characterized in that a time bus connector further comprises control means to initiate in the event of unsuccessful data transmission to a first destination time bus connector, data transmission to a second destination time bus connector if source data for said second destination exists, said control means defining the new destination address in said destination address storage.

8. A system as claimed in claim 7, characterized in that a time bus connector further comprises control means to retransmit data previously unaccepted by a destination time bus interface in a sequence defined by the organisation of the destination address storage of said source time bus interface.

9. A system as claimed in claim 8, characterized in that a time bus connector comprises further storage means, means to preset in said further storage a maximum limit to the number of retransmissions of previously unsuccessful data transmission permissible, means to continuously detect said total existing unsuccessful transmissions, means to compare said detected total with said pre-set maximum limit and to indicate when said preset maximum limit has been reached.

10. A system as claimed in claim 9, characterized in that a time bus connector further comprises means to vary said pre-set maximum limit.

11. A system as claimed in claim 1, characterized in that a time bus connector further comprises means to correct limited errors relating to every data transmission circulating on said time bus, said means indicating a system error when said error correction means becomes invalid.

* * * * *

UNITED STATES PATENT AND TRADEMARK OFFICE
CERTIFICATE OF CORRECTION

PATENT NO. : 4,271,506

DATED : June 2, 1981

INVENTOR(S) : GUILLAUME BROC et al

It is certified that error appears in the above-identified patent and that said Letters Patent are hereby corrected as shown below:

On the Title Page under item [73], change the Assignee to read -- Telecommunications Radioelectriques et Telephoniques T.R.T., Paris France --

Signed and Sealed this

Third Day of November 1981

|SEAL|

Attest:

GERALD J. MOSSINGHOFF

Attesting Officer      Commissioner of Patents and Trademarks